US011222485B2

(12) United States Patent
Luke

(10) Patent No.: US 11,222,485 B2
(45) Date of Patent: Jan. 11, 2022

(54) APPARATUS, METHOD AND ARTICLE FOR PROVIDING INFORMATION REGARDING A VEHICLE VIA A MOBILE DEVICE

(71) Applicant: Gogoro Inc., Wanchai (HK)

(72) Inventor: Hok-Sum Horace Luke, Mercer Island, WA (US)

(73) Assignee: Gogoro Inc., Hong Kong (CN)

( * ) Notice: Subject to any disclaimer, the term of this patent is extended or adjusted under 35 U.S.C. 154(b) by 0 days.

(21) Appl. No.: 14/017,081

(22) Filed: Sep. 3, 2013

(65) Prior Publication Data

US 2014/0277844 A1 Sep. 18, 2014
US 2017/0053459 A9 Feb. 23, 2017

Related U.S. Application Data

(60) Provisional application No. 61/780,781, filed on Mar. 13, 2013, provisional application No. 61/778,038, filed on Mar. 12, 2013.

(51) Int. Cl.
*G07C 5/00* (2006.01)
*B60L 3/12* (2006.01)
(Continued)

(52) U.S. Cl.
CPC ............ *G07C 5/008* (2013.01); *B60L 3/12* (2013.01); *B60L 53/305* (2019.02);
(Continued)

(58) Field of Classification Search
CPC ........ G06Q 20/40; G06Q 20/18; G01R 31/36; H02J 7/00; H02J 7/0027; B60Q 9/00;
(Continued)

(56) References Cited

U.S. PATENT DOCUMENTS 1,387,848 A 8/1921 Good
3,470,974 A 10/1969 Pefine
(Continued)

FOREIGN PATENT DOCUMENTS

CA 2 865 976 A1 9/2013
CN 1211844 A 3/1999
(Continued)

OTHER PUBLICATIONS

Chen et al., "Apparatus, System, and Method for Authentication of Vehicular Components," U.S. Appl. No. 13/918,703, filed Jun. 14, 2013, 84 pages.
(Continued)

*Primary Examiner* — Isaac G Smith
(74) *Attorney, Agent, or Firm* — Perkins Coie LLP

(57) ABSTRACT

A network of collection, charging and distribution machines collect, charge and distribute portable electrical energy storage devices (e.g., batteries, supercapacitors or ultracapacitors). Relevant information regarding vehicles that use the collection and distribution machines is communicated to or acquired by mobile devices of users associated with one or more of the vehicles. The vehicle information may include information regarding diagnostics or status of the vehicle and information regarding usage history of the vehicle received from different sources. This information is then processed and analyzed at the mobile device and such information is presented by the mobile device in a useful manner to the user and/or communicated to another device external to the mobile device, such as the vehicle, for further processing or communication of the data.

20 Claims, 19 Drawing Sheets

(51) Int. Cl.
*B60L 53/30* (2019.01)
*B60L 53/66* (2019.01)
*B60L 53/67* (2019.01)

(52) U.S. Cl.
CPC .............. *B60L 53/665* (2019.02); *B60L 53/67* (2019.02); *B60L 2240/70* (2013.01); *B60L 2250/10* (2013.01); *B60L 2250/12* (2013.01); *B60L 2250/16* (2013.01); *B60L 2250/20* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 30/14* (2013.01)

(58) Field of Classification Search
CPC ........ B60L 58/16; B60L 53/305; B60L 53/67; B60L 53/665; B60L 3/12; G07C 5/008
USPC .... 701/2, 22, 33.4, 29.1; 320/106, 109, 132; 700/225, 226, 215; 705/65, 7.12, 7.22, 705/16; 455/420
See application file for complete search history.

(56) References Cited

U.S. PATENT DOCUMENTS

| | | |
|---|---|---|
| 3,664,450 A | 5/1972 | Udden et al. |
| 3,678,455 A | 7/1972 | Levey |
| 4,087,895 A | 5/1978 | Etienne |
| 4,129,759 A | 12/1978 | Hug |
| 4,216,839 A | 8/1980 | Gould et al. |
| 4,669,570 A | 6/1987 | Perret |
| 5,187,423 A | 2/1993 | Marton |
| 5,189,325 A | 2/1993 | Jarczynski |
| 5,236,069 A | 8/1993 | Peng |
| 5,339,250 A | 8/1994 | Durbin |
| 5,349,535 A | 9/1994 | Gupta |
| 5,376,869 A | 12/1994 | Konrad |
| 5,544,784 A | 8/1996 | Malaspina |
| 5,596,261 A | 1/1997 | Suyama |
| 5,627,752 A | 5/1997 | Buck et al. |
| 5,631,536 A | 5/1997 | Tseng |
| 5,642,270 A | 6/1997 | Green et al. |
| 5,648,897 A | 7/1997 | Johnson et al. |
| 5,815,824 A | 9/1998 | Saga et al. |
| 5,839,800 A | 11/1998 | Koga et al. |
| 5,898,282 A | 4/1999 | Drozdz et al. |
| 5,998,963 A | 12/1999 | Aarseth |
| 6,016,882 A | 1/2000 | Ishikawa |
| 6,094,028 A | 7/2000 | Gu et al. |
| 6,154,006 A | 11/2000 | Hatanaka et al. |
| 6,177,867 B1 | 1/2001 | Simon et al. |
| 6,177,879 B1 | 1/2001 | Kokubu et al. |
| 6,236,333 B1 | 5/2001 | King |
| 6,403,251 B1 | 6/2002 | Baggaley et al. |
| 6,498,457 B1 | 12/2002 | Tsuboi |
| 6,515,580 B1 | 2/2003 | Isoda et al. |
| 6,583,592 B2 | 6/2003 | Omata et al. |
| 6,593,713 B2 | 7/2003 | Morimoto et al. |
| 6,796,396 B2 | 9/2004 | Kamen et al. |
| 6,822,560 B2 | 11/2004 | Geber et al. |
| 6,854,773 B2 | 2/2005 | Lin |
| 6,899,268 B2 | 5/2005 | Hara |
| 6,952,795 B2 | 10/2005 | O'Gorman et al. |
| 7,010,682 B2 | 3/2006 | Reinold et al. |
| 7,131,005 B2 | 10/2006 | Levenson et al. |
| 7,392,068 B2 | 6/2008 | Dayan et al. |
| 7,415,332 B2 | 8/2008 | Ito et al. |
| 7,426,910 B2 | 9/2008 | Elwart |
| 7,495,543 B2 | 2/2009 | Denison et al. |
| 7,567,166 B2 | 7/2009 | Bourgine De Meder |
| 7,592,728 B2 | 9/2009 | Jones et al. |
| 7,596,709 B2 | 9/2009 | Cooper et al. |
| 7,617,893 B2 | 11/2009 | Syed et al. |
| 7,698,044 B2 | 4/2010 | Prakash et al. |
| 7,728,548 B2 | 6/2010 | Daynes et al. |
| 7,761,307 B2 | 7/2010 | Ochi et al. |
| 7,778,746 B2 | 8/2010 | McLeod et al. |
| 7,863,858 B2 | 1/2011 | Gangstoe et al. |
| 7,868,591 B2 | 1/2011 | Phillips et al. |
| 7,898,439 B2 | 3/2011 | Bettez et al. |
| 7,908,020 B2 | 3/2011 | Pieronek |
| 7,923,144 B2 | 4/2011 | Kohn et al. |
| 7,948,207 B2 | 5/2011 | Scheucher |
| 7,979,147 B1 | 7/2011 | Dunn |
| 7,993,155 B2 | 8/2011 | Heichal et al. |
| 8,006,793 B2 | 8/2011 | Heichal et al. |
| 8,006,973 B2 | 8/2011 | Toba et al. |
| 8,013,571 B2 | 9/2011 | Agassi et al. |
| 8,035,341 B2 | 10/2011 | Genzel et al. |
| 8,035,349 B2 | 10/2011 | Lubawy |
| 8,063,762 B2 | 11/2011 | Sid |
| 8,068,952 B2 * | 11/2011 | Valentine ............... B22D 11/12 701/31.4 |
| 8,106,631 B2 * | 1/2012 | Abe .......................... 320/137 |
| 8,118,132 B2 | 2/2012 | Gray, Jr. |
| 8,120,364 B2 * | 2/2012 | Elder ................... B60L 3/0046 320/127 |
| 8,164,300 B2 | 4/2012 | Agassi et al. |
| 8,219,839 B2 | 7/2012 | Akimoto |
| 8,229,625 B2 | 7/2012 | Lal et al. |
| 8,265,816 B1 | 9/2012 | LaFrance |
| 8,301,365 B2 | 10/2012 | Niwa et al. |
| 8,319,605 B2 | 11/2012 | Hassan et al. |
| 8,326,259 B2 * | 12/2012 | Gautama ................ G08C 17/02 455/404.1 |
| 8,354,768 B2 | 1/2013 | Cipriani |
| 8,355,965 B2 | 1/2013 | Yamada |
| 8,378,627 B2 | 2/2013 | Asada et al. |
| 8,412,401 B2 | 4/2013 | Bertosa et al. |
| 8,437,908 B2 | 5/2013 | Goff et al. |
| 8,447,598 B2 | 5/2013 | Chutorash et al. |
| 8,614,565 B2 | 12/2013 | Lubawy |
| 8,996,188 B2 | 3/2015 | Frader-Thompson et al. |
| 2001/0018903 A1 | 9/2001 | Hirose et al. |
| 2002/0023789 A1 | 2/2002 | Morisawa et al. |
| 2002/0026252 A1 | 2/2002 | Wruck et al. |
| 2002/0070851 A1 | 6/2002 | Raichle et al. |
| 2003/0141840 A1 | 7/2003 | Sanders |
| 2003/0163434 A1 | 8/2003 | Barends |
| 2003/0209375 A1 | 11/2003 | Suzuki et al. |
| 2004/0236615 A1 | 11/2004 | Msndy |
| 2004/0246119 A1 | 12/2004 | Martin et al. |
| 2006/0047380 A1 | 3/2006 | Welch |
| 2006/0208850 A1 | 9/2006 | Ikeuchi et al. |
| 2006/0284601 A1 | 12/2006 | Salasoo et al. |
| 2007/0026996 A1 | 2/2007 | Ayabe et al. |
| 2007/0035397 A1 | 2/2007 | Patenaude et al. |
| 2007/0069687 A1 | 3/2007 | Suzuki |
| 2007/0090921 A1 | 4/2007 | Fisher |
| 2007/0145945 A1 | 6/2007 | McGinley et al. |
| 2007/0159297 A1 | 7/2007 | Paulk et al. |
| 2007/0208468 A1 | 9/2007 | Sankaran et al. |
| 2007/0287439 A1 * | 12/2007 | Weyl et al. ................... 455/420 |
| 2008/0276110 A1 | 11/2008 | Indiani et al. |
| 2009/0024872 A1 | 1/2009 | Beverly |
| 2009/0033456 A1 | 2/2009 | Castillo et al. |
| 2009/0082957 A1 | 3/2009 | Agassi et al. |
| 2009/0112394 A1 | 4/2009 | Lepejian et al. |
| 2009/0158790 A1 | 6/2009 | Oliver |
| 2009/0198372 A1 * | 8/2009 | Hammerslag ....... B60L 11/1822 700/226 |
| 2009/0294188 A1 | 12/2009 | Cole |
| 2010/0012406 A1 | 1/2010 | Kressner et al. |
| 2010/0017045 A1 | 1/2010 | Nesler et al. |
| 2010/0017249 A1 * | 1/2010 | Fincham .................... B60L 3/12 705/412 |
| 2010/0026238 A1 | 2/2010 | Suzuki et al. |
| 2010/0051363 A1 | 3/2010 | Inoue et al. |
| 2010/0052588 A1 | 3/2010 | Okamura et al. |
| 2010/0089547 A1 | 4/2010 | King et al. |
| 2010/0094496 A1 * | 4/2010 | Hershkovitz ............. B60L 3/12 701/22 |

(56) References Cited

U.S. PATENT DOCUMENTS

| | | |
|---|---|---|
| 2010/0114798 A1 | 5/2010 | Sirton |
| 2010/0114800 A1 | 5/2010 | Yasuda et al. |
| 2010/0161481 A1 | 6/2010 | Littrell |
| 2010/0198535 A1 | 8/2010 | Brown et al. |
| 2010/0198754 A1 | 8/2010 | Jones et al. |
| 2010/0201482 A1 | 8/2010 | Robertson et al. |
| 2010/0235043 A1 | 9/2010 | Seta et al. |
| 2010/0262312 A1 | 10/2010 | Kubota et al. |
| 2010/0308989 A1 | 12/2010 | Gasper |
| 2011/0025267 A1 | 2/2011 | Kamen et al. |
| 2011/0029157 A1* | 2/2011 | Muzaffer ............... B60L 58/16 701/2 |
| 2011/0032110 A1 | 2/2011 | Taguchi |
| 2011/0071932 A1 | 3/2011 | Agassi et al. |
| 2011/0082621 A1 | 4/2011 | Berkobin et al. |
| 2011/0095723 A1 | 4/2011 | Bhade et al. |
| 2011/0106329 A1 | 5/2011 | Donnelly et al. |
| 2011/0112710 A1 | 5/2011 | Meyer-Ebeling et al. |
| 2011/0114798 A1 | 5/2011 | Gemmati |
| 2011/0120789 A1 | 5/2011 | Teraya |
| 2011/0148346 A1 | 6/2011 | Gagosz et al. |
| 2011/0153141 A1 | 6/2011 | Beechie et al. |
| 2011/0160992 A1 | 6/2011 | Crombez |
| 2011/0169447 A1 | 7/2011 | Brown et al. |
| 2011/0200193 A1* | 8/2011 | Blitz et al. ............... 380/277 |
| 2011/0202476 A1 | 8/2011 | Nagy et al. |
| 2011/0218703 A1 | 9/2011 | Uchida |
| 2011/0224900 A1 | 9/2011 | Hiruta et al. |
| 2011/0241824 A1 | 10/2011 | Uesugi |
| 2011/0257973 A1 | 10/2011 | Chutorash et al. |
| 2011/0260691 A1 | 10/2011 | Ishibashi et al. |
| 2011/0270480 A1 | 11/2011 | Ishibashi et al. |
| 2011/0279257 A1 | 11/2011 | Au et al. |
| 2011/0292667 A1 | 12/2011 | Meyers |
| 2011/0295454 A1 | 12/2011 | Meyers |
| 2011/0303509 A1 | 12/2011 | Agassi et al. |
| 2012/0000720 A1 | 1/2012 | Honda et al. |
| 2012/0013182 A1 | 1/2012 | Minegishi et al. |
| 2012/0019196 A1 | 1/2012 | Fung |
| 2012/0038473 A1 | 2/2012 | Fecher |
| 2012/0062361 A1 | 3/2012 | Kosugi |
| 2012/0068817 A1 | 3/2012 | Fisher |
| 2012/0078413 A1 | 3/2012 | Baker, Jr. |
| 2012/0105078 A1 | 5/2012 | Kikuchi et al. |
| 2012/0109519 A1 | 5/2012 | Uyeki |
| 2012/0123633 A1* | 5/2012 | Uyeki ............... B60L 3/12 701/33.2 |
| 2012/0123661 A1 | 5/2012 | Gray, Jr. |
| 2012/0126969 A1 | 5/2012 | Wilbur et al. |
| 2012/0157083 A1 | 6/2012 | Otterson |
| 2012/0158229 A1 | 6/2012 | Schaefer |
| 2012/0167071 A1 | 6/2012 | Paek |
| 2012/0194346 A1 | 8/2012 | Tsai et al. |
| 2012/0223575 A1 | 9/2012 | Hachiya et al. |
| 2012/0248868 A1 | 10/2012 | Mobin et al. |
| 2012/0248869 A1 | 10/2012 | Itagaki et al. |
| 2012/0253567 A1 | 10/2012 | Levy et al. |
| 2012/0256588 A1* | 10/2012 | Hayashi et al. ............... 320/109 |
| 2012/0259665 A1 | 10/2012 | Pandhi et al. |
| 2012/0271723 A1* | 10/2012 | Penilla ............... G06Q 20/18 705/16 |
| 2012/0280573 A1 | 11/2012 | Ohkura et al. |
| 2012/0296512 A1 | 11/2012 | Lee et al. |
| 2012/0299537 A1 | 11/2012 | Kikuchi |
| 2012/0299721 A1* | 11/2012 | Jones ............... 340/521 |
| 2012/0316671 A1 | 12/2012 | Hammerslag et al. |
| 2013/0024306 A1* | 1/2013 | Shah ............... G06Q 20/32 705/17 |
| 2013/0026971 A1 | 1/2013 | Luke et al. |
| 2013/0026972 A1 | 1/2013 | Luke et al. |
| 2013/0026973 A1 | 1/2013 | Luke et al. |
| 2013/0027183 A1 | 1/2013 | Wu et al. |
| 2013/0030580 A1 | 1/2013 | Luke et al. |
| 2013/0030581 A1 | 1/2013 | Luke et al. |
| 2013/0030608 A1 | 1/2013 | Taylor et al. |
| 2013/0030630 A1 | 1/2013 | Luke et al. |
| 2013/0030696 A1 | 1/2013 | Wu et al. |
| 2013/0030920 A1 | 1/2013 | Wu et al. |
| 2013/0031318 A1 | 1/2013 | Chen et al. |
| 2013/0033203 A1 | 2/2013 | Luke et al. |
| 2013/0046457 A1 | 2/2013 | Pettersson |
| 2013/0074411 A1 | 3/2013 | Ferguson et al. |
| 2013/0090795 A1 | 4/2013 | Luke et al. |
| 2013/0093271 A1 | 4/2013 | Luke et al. |
| 2013/0093368 A1 | 4/2013 | Luke et al. |
| 2013/0093384 A1 | 4/2013 | Nyu et al. |
| 2013/0096751 A1* | 4/2013 | Riley ............... B60L 53/63 701/22 |
| 2013/0116892 A1 | 5/2013 | Wu et al. |
| 2013/0119898 A1 | 5/2013 | Ohkura |
| 2013/0127416 A1 | 5/2013 | Karner et al. |
| 2013/0132307 A1 | 5/2013 | Phelps et al. |
| 2013/0179061 A1 | 7/2013 | Gadh et al. |
| 2013/0181582 A1 | 7/2013 | Luke et al. |
| 2013/0200845 A1 | 8/2013 | Bito |
| 2013/0226441 A1* | 8/2013 | Horita ............... G01C 21/3469 701/118 |
| 2013/0254097 A1* | 9/2013 | Marathe ............... G07F 15/005 705/39 |
| 2013/0282254 A1 | 10/2013 | Dwan et al. |
| 2014/0028089 A1 | 1/2014 | Luke et al. |
| 2014/0145841 A1* | 5/2014 | Abboud ............... G07C 5/08 340/439 |
| 2014/0163813 A1 | 6/2014 | Chen et al. |
| 2014/0368032 A1 | 12/2014 | Doerndorfer |
| 2015/0042157 A1 | 2/2015 | Chen et al. |

FOREIGN PATENT DOCUMENTS

| | | |
|---|---|---|
| CN | 1877473 A | 12/2006 |
| CN | 101071953 A | 11/2007 |
| CN | 101417637 A | 4/2009 |
| CN | 101950998 A | 1/2011 |
| CN | 102064565 A | 5/2011 |
| CN | 102529969 | 7/2012 |
| CN | 102572151 | 7/2012 |
| DE | 44 32 539 A1 | 6/1995 |
| DE | 10 2007 045633 A1 | 4/2009 |
| DE | 10 2009 016869 A1 | 10/2010 |
| DE | 10 2010 039075 A1 | 2/2011 |
| EP | 0 693 813 A1 | 1/1996 |
| EP | 1 177 955 A2 | 2/2002 |
| EP | 2 101 390 A2 | 9/2009 |
| EP | 2 182 575 A1 | 5/2010 |
| EP | 2 230 146 A2 | 9/2010 |
| EP | 2 428 939 A1 | 3/2012 |
| JP | 5-38003 A | 2/1993 |
| JP | 07-031008 A | 1/1995 |
| JP | 7-36504 U | 7/1995 |
| JP | 8-178683 A | 7/1996 |
| JP | 9-119839 A | 5/1997 |
| JP | 10-117406 A | 5/1998 |
| JP | 10-170293 A | 6/1998 |
| JP | 10-307952 A | 11/1998 |
| JP | 11-049079 | 2/1999 |
| JP | 11-51681 A | 2/1999 |
| JP | 11-176487 A | 7/1999 |
| JP | 11-205914 A | 7/1999 |
| JP | 2000-102102 A | 4/2000 |
| JP | 2000-102103 A | 4/2000 |
| JP | 2000-287302 A | 10/2000 |
| JP | 2000-341868 A | 12/2000 |
| JP | 2001-128301 | 5/2001 |
| JP | 2003-118397 | 4/2003 |
| JP | 2003-262525 A | 9/2003 |
| JP | 2005-67453 A | 3/2005 |
| JP | 2006-121874 A | 5/2006 |
| JP | 2007-60353 A | 3/2007 |
| JP | 2008-127894 A | 6/2008 |
| JP | 2008-219953 A | 9/2008 |
| JP | 2008-301598 A | 12/2008 |
| JP | 2009-512035 A | 3/2009 |
| JP | 2009-103504 A | 5/2009 |

(56) References Cited

FOREIGN PATENT DOCUMENTS

| | | |
|---|---|---|
| JP | 2009-171646 A | 7/2009 |
| JP | 2009-171647 A | 7/2009 |
| JP | 4319289 B2 | 8/2009 |
| JP | 2010-022148 A | 1/2010 |
| JP | 2010-191636 A | 9/2010 |
| JP | 2010-200405 A | 9/2010 |
| JP | 2010-269686 A | 12/2010 |
| JP | 2010-540907 A | 12/2010 |
| JP | 2011-096233 | 5/2011 |
| JP | 2011-102801 A | 5/2011 |
| JP | 2011-126452 | 6/2011 |
| JP | 2011-131631 A | 7/2011 |
| JP | 2011-131805 A | 7/2011 |
| JP | 2011-142704 A | 7/2011 |
| JP | 2011-233470 A | 11/2011 |
| JP | 2012-112853 | 6/2012 |
| JP | 2012-151916 A | 8/2012 |
| JP | 2013-020487 | 1/2013 |
| KR | 1998-045020 U | 9/1998 |
| KR | 2004-0005146 A | 1/2004 |
| KR | 20100012401 A | 2/2010 |
| KR | 10-0971278 B1 | 7/2010 |
| KR | 20110004292 A | 1/2011 |
| KR | 20110041783 A | 4/2011 |
| KR | 20120020554 A | 3/2012 |
| TW | 200404201 A | 3/2004 |
| TW | 200634594 A | 10/2006 |
| TW | 200836452 A | 9/2008 |
| TW | I315116 B | 9/2009 |
| TW | M371880 U1 | 1/2010 |
| TW | M379269 U1 | 4/2010 |
| TW | M379789 U1 | 5/2010 |
| TW | M385047 U1 | 7/2010 |
| TW | 201043986 A1 | 12/2010 |
| TW | 201044266 A1 | 12/2010 |
| WO | 98/21132 A1 | 5/1998 |
| WO | 2009/039454 A1 | 3/2009 |
| WO | 2010/033517 A2 | 3/2010 |
| WO | 2010/033881 A1 | 3/2010 |
| WO | 2010/143483 A1 | 12/2010 |
| WO | 2011/138205 A1 | 11/2011 |
| WO | 2012/085992 A1 | 6/2012 |
| WO | 2012/160407 A1 | 11/2012 |
| WO | 2012/160557 A2 | 11/2012 |
| WO | 2013016564 | 1/2013 |
| WO | 2013/024483 A2 | 2/2013 |
| WO | 2013/024484 A1 | 2/2013 |
| WO | 2013/042216 A1 | 3/2013 |
| WO | 2013/074819 A1 | 5/2013 |
| WO | 2013/080211 A1 | 6/2013 |
| WO | 2013/102894 A1 | 7/2013 |
| WO | 2013/108246 A2 | 7/2013 |
| WO | 2013/118113 A2 | 8/2013 |
| WO | 2013/128007 A2 | 9/2013 |
| WO | 2013/128009 A2 | 9/2013 |
| WO | 2013/128009 A3 | 9/2013 |
| WO | 2013/142154 A1 | 9/2013 |
| WO | 2013/144951 A1 | 10/2013 |

OTHER PUBLICATIONS

Chen et al., "Apparatus, System, and Method for Authentication of Vehicular Components," U.S. Appl. No. 61/783,041, filed Mar. 14, 2013, 84 pages.
Chen et al., "Apparatus, System, and Method for Authentication of Vehicular Components," Office Action dated Nov. 22, 2013, for U.S. Appl. No. 13/918,703, 35 pages.
Chen et al., "Apparatus, System, and Method for Authentication of Vehicular Components," Notice of Allowance dated Mar. 25, 2014, for U.S. Appl. No. 13/918,703, 7 pages.
Chen et al., "Apparatus, Method and Article for Providing Vehicle Diagnostic Data," U.S. Appl. No. 14/022,134, filed Sep. 9, 2013, 61 pages.
Chen et al., "Apparatus, Method and Article for Providing Vehicle Diagnostic Data," Office Action dated Dec. 30, 2013, for U.S. Appl. No. 14/022,134, 20 pages.
Chen et al., "Apparatus, Method and Article for Providing Vehicle Diagnostic Data," U.S. Appl. No. 61/601,404, filed Feb. 21, 2012, 56 pages.
Communication pursuant to Rules 161(2) and 162 EPC, for corresponding European Patent Application No. 12817273.1, dated Mar. 25, 2014, 3 pages.
Communication pursuant to Rules 161(2) and 162 EPC, for corresponding European Patent Application No. 12817141.0, dated Mar. 26, 2014, 3 pages.
Communication pursuant to Rules 161(2) and 162 EPC, for corresponding European Patent Application No. 12818308.4, dated Mar. 26, 2014, 3 pages.
Communication pursuant to Rules 161(2) and 162 EPC, for corresponding European Patent Application No. 12817696.3, dated Mar. 27, 2014, 3 pages.
Communication pursuant to Rules 161(2) and 162 EPC, for corresponding European Patent Application No. 12817883.7, dated Mar. 27, 2014, 3 pages.
Communication pursuant to Rules 161(2) and 162 EPC, for corresponding European Patent Application No. 12818447.0, dated Mar. 27, 2014, 3 pages.
Huang et al., "Apparatus, Method and Article for Vehicle Turn Signals," U.S. Appl. No. 61/727,403, filed Nov. 16, 2012, 41 pages.
Huang et al., "Apparatus, Method and Article for Vehicle Turn Signals," U.S. Appl. No. 14/079,894, filed Nov. 14, 2013, 41 pages.
International Preliminary Report on Patentability and Written Opinion for corresponding International Patent Application No. PCT/US2012/048349, dated Jan. 28, 2014, 5 pages.
International Preliminary Report on Patentability and Written Opinion for corresponding International Patent Application No. PCT/US2012/048354, dated Jan. 28, 2014, 7 pages.
International Preliminary Report on Patentability and Written Opinion for corresponding International Patent Application No. PCT/US2012/048358, dated Jan. 28, 2014, 5 pages.
International Preliminary Report on Patentability and Written Opinion for corresponding International Patent Application No. PCT/US2012/048366, dated Jan. 28, 2014, 5 pages.
International Preliminary Report on Patentability and Written Opinion for corresponding International Patent Application No. PCT/US2012/048367, dated Jan. 28, 2014, 4 pages.
International Preliminary Report on Patentability and Written Opinion for corresponding International Patent Application No. PCT/US2012/048375, dated Jan. 28, 2014, 5 pages.
International Preliminary Report on Patentability and Written Opinion for corresponding International Patent Application No. PCT/US2012/048379, dated Jan. 28, 2014, 5 pages.
International Preliminary Report on Patentability and Written Opinion for corresponding International Patent Application No. PCT/US2012/048380, dated Jan. 28, 2014, 5 pages.
International Preliminary Report on Patentability and Written Opinion for corresponding International Patent Application No. PCT/US2012/048382, dated Jan. 28, 2014, 5 pages.
International Preliminary Report on Patentability and Written Opinion for corresponding International Patent Application No. PCT/US2012/048391, dated Jan. 28, 2014, 6 pages.
International Search Report and Written Opinion for corresponding International Patent Application No. PCT/US2012/048379, dated Dec. 17, 2012, 9 pages.
International Search Report and Written Opinion for corresponding International Patent Application No. PCT/US2012/048380, dated Feb. 27, 2013, 9 pages.
International Search Report and Written Opinion for corresponding International Patent Application No. PCT/US2012/048382, dated Feb. 27, 2013, 9 pages.
International Search Report and Written Opinion for corresponding International Patent Application No. PCT/US2012/063979, dated Mar. 4, 2013, 10 pages.
International Search Report and Written Opinion for corresponding International Patent Application No. PCT/US2012/048347, dated Dec. 18, 2012, 8 pages.

(56) References Cited

OTHER PUBLICATIONS

International Search Report and Written Opinion for corresponding International Patent Application No. PCT/US2012/048349, dated Feb. 18, 2013, 9 pages.
International Search Report and Written Opinion for corresponding International Patent Application No. PCT/US2012/048354, dated Feb. 18, 2013, 11 pages.
International Search Report and Written Opinion for corresponding International Patent Application No. PCT/US2012/048358, dated Feb. 25, 2013, 9 pages.
International Search Report and Written Opinion for corresponding International Patent Application No. PCT/US2012/048366, dated Jan. 21, 2013, 10 pages.
International Search Report and Written Opinion for corresponding International Patent Application No. PCT/US2012/048367, dated Jan. 17, 2013, 8 pages.
International Search Report and Written Opinion for corresponding International Patent Application No. PCT/US2012/048375, dated Jan. 23, 2013, 9 pages.
International Search Report and Written Opinion for corresponding International Patent Application No. PCT/US2012/048391, dated Dec. 21, 2012, 9 pages.
International Search Report and Written Opinion for corresponding International Application No. PCT/US2012/058930, dated Mar. 15, 2013, 11 pages.
International Search Report and Written Opinion for corresponding International Patent Application No. PCT/US2013/070131, dated Feb. 19, 2014, 17 pages.
Luke et al., "Apparatus, Method and Article for Authentication, Security and Control of Portable Charging Devices and Power Storage Devices, Such as Batteries," U.S. Appl. No. 14/017,090, filed Sep. 3, 2013, 69 pages.
Luke et al., "Apparatus, Method and Article for Authentication, Security and Control of Portable Charging Devices and Power Storage Devices, Such as Batteries," Office Action dated Jan. 6, 2014, for U.S. Appl. No. 14/017,090, 19 pages.
Luke et al., "Apparatus, Method and Article for Authentication, Security and Control of Portable Charging Devices and Power Storage Devices, Such as Batteries," U.S. Appl. No. 61/773,621, filed Mar. 6, 2013, 69 pages.
Luke et al., "Apparatus, Method and Article for Providing Targeted Advertising in a Rechargeable Electrical Power Storage Device Distribution Environment," U.S. Appl. No. 61/773,614, filed Mar. 6, 2013, 77 pages.
Luke et al., "Detectible Indication of an Electric Motor Vehicle Standby Mode," U.S. Appl. No. 61/543,720, filed Oct. 5, 2011, 35 pages.
Luke et al., "Detectible Indication of an Electric Motor Vehicle Standby Mode," U.S. Appl. No. 61/684,432, filed Aug. 17, 2012, 41 pages.
Luke et al., "Detectible Indication of an Electric Motor Vehicle Standby Mode," Office Action for U.S. Appl. No. 13/646,320, dated May 30, 2013, 13 pages.
Luke et al., "Drive Assembly for Electric Powered Device," U.S. Appl. No. 61/546,411, filed Oct. 12, 2011, 18 pages.
Luke et al., "Modular System for Collection and Distribution of Electric Storage Devices," U.S. Appl. No. 61/789,065, filed Mar. 15, 2013, 76 pages.
Luke et al., "Modular System for Collection and Distribution of Electric Storage Devices," U.S. Appl. No. 14/202,589, filed Mar. 10, 2014, 76 pages.
Luke et al., "Apparatus, Method and Article for Authentication, Security and Control of Power Storage Devices, Such as Batteries," U.S. Appl. No. 61/534,761, filed Sep. 14, 2011, 55 pages.
Luke et al., "Apparatus, Method and Article for Authentication, Security and Control of Power Storage Devices, Such as Batteries," Office Action dated Feb. 26, 2014, for U.S. Appl. No. 13/559,038, 13 pages.
Luke et al., "Apparatus, Method and Article for Authentication, Security and Control of Power Storage Devices, Such as Batteries, Based on User Profiles," U.S. Appl. No. 61/534,772, filed Sep. 14, 2011, 55 pages.
Luke et al., "Apparatus, Method and Article for Authentication, Security and Control of Power Storage Devices, Such as Batteries," Office Action dated Feb. 25, 2014, for U.S. Appl. No. 14/023,344, 12 pages.
Luke et al., "Apparatus, Method and Article for Collection, Charging and Distributing Power Storage Devices, Such as Batteries," U.S. Appl. No. 61/511,900, filed Jul. 26, 2011, 73 pages.
Luke et al., "Apparatus, Method and Article for Collection, Charging and Distributing Power Storage Devices, Such as Batteries," U.S. Appl. No. 61/647,936, filed May 16, 2012, 76 pages.
Luke et al., "Apparatus, Method and Article for Redistributing Power Storage Devices, Such as Batteries, Between Collection, Charging and Distribution Machines," U.S. Appl. No. 61/534,753, filed Sep. 14, 2011, 65 pages.
Luke et al., "Dynamically Limiting Vehicle Operation for Best Effort Economy," U.S. Appl. No. 61/511,880, filed Jul. 26, 2011, 52 pages.
Luke et al., "Dynamically Limiting Vehicle Operation for Best Effort Economy," Office Action for U.S. Appl. No. 13/559,264, dated Aug. 14, 2013, 21 pages.
Luke et al., "Dynamically Limiting Vehicle Operation for Best Effort Economy," Office Action for U.S. Appl. No. 13/559,264, dated Feb. 12, 2014, 24 pages.
Luke et al., "Thermal Management of Components in Electric Motor Drive Vehicles," U.S. Appl. No. 61/647,941, filed May 16, 2012, 47 pages.
Luke et al., "Thermal Management of Components in Electric Motor Drive Vehicles," U.S. Appl. No. 61/511,887, filed Jul. 26, 2011, 44 pages.
Luke, "Apparatus, Method and Article for Changing Portable Electrical Power Storage Device Exchange Plans," U.S. Appl. No. 14/204,587, filed Mar. 11, 2014, 56 pages.
Luke, "Apparatus, Method and Article for Changing Portable Electrical Power Storage Device Exchange Plans," U.S. Appl. No. 61/778,038, filed Mar. 12, 2013, 56 pages.
Luke, "Apparatus, Method and Article for Providing Information Regarding a Vehicle via a Mobile Device," U.S. Appl. No. 61/780,781, filed Mar. 13, 2013, 80 pages.
Taylor et al., "Apparatus, Method and Article for Physical Security of Power Storage Devices in Vehicles," U.S. Appl. No. 61/557,170, filed Nov. 8, 2011, 60 pages.
Taylor et al., "Apparatus, Method and Article for Physical Security of Power Storage Devices in Vehicles," Notice of Allowance for U.S. Appl. No. 13/559,054, dated May 30, 2013, 32 pages.
Taylor et al., "Apparatus, Method and Article for Physical Security of Power Storage Devices in Vehicles," Office Action for U.S. Appl. No. 13/559,054, dated Dec. 3, 2012, 11 pages.
Taylor et al., "Apparatus, Method and Article for Physical Security of Power Storage Devices in Vehicles," U.S. Appl. No. 14/012,845, filed Aug. 28, 2013, 64 pages.
Wu et al., "Battery Configuration for an Electric Vehicle," U.S. Appl. No. 61/716,388, filed Oct. 19, 2012, 37 pages.
Wu et al., "Apparatus, Method and Article for a Power Storage Device Compartment," U.S. Appl. No. 61/581,566, filed Dec. 29, 2011, 61 pages.
Wu et al., "Apparatus, Method and Article for a Power Storage Device Compartment," Office Action for U.S. Appl. No. 13/559,125, dated Feb. 24, 2014, 28 pages.
Wu et al., "Apparatus, Method and Article for Providing Information Regarding Availability of Power Storage Devices at a Power Storage Device Collection, Charging and Distribution Machine," U.S. Appl. No. 61/601,953, filed Feb. 22, 2012, 53 pages.
Wu et al., "Apparatus, Method and Article for Providing Information Regarding Availability of Power Storage Devices at a Power Storage Device Collection, Charging and Distribution Machine," U.S. Appl. No. 14/022,140, filed Sep. 9, 2013, 56 pages.
Wu et al., "Apparatus, Method and Article for Providing Information Regarding Availability of Power Storage Devices at a Power

(56) References Cited

OTHER PUBLICATIONS

Storage Device Collection, Charging and Distribution Machine," Office Action dated Mar. 5, 2014, for U.S. Appl. No. 14/022,140, 8 pages.
Wu et al., "Apparatus, Method and Article for Providing Locations of Power Storage Device Collection, Charging and Distribution Machines," U.S. Appl. No. 61/601,949, filed Feb. 22, 2012, 56 pages.
Wu et al., "Apparatus, Method and Article for Providing Locations of Power Storage Device Collection, Charging and Distribution Machines," Office Action for U.S. Appl. No. 13/559,333, dated Jul. 3, 2013, 14 pages.
Wu et al., "Apparatus, Method and Article for Providing Locations of Power Storage Device Collection, Charging and Distribution Machines," U.S. Appl. No. 14/022,147, filed Sep. 9, 2013, 56 pages.
Wu et al., "Apparatus, Method and Article for Providing Locations of Power Storage Device Collection, Charging and Distribution Machines," Office Action dated Nov. 19, 2013, for U.S. Appl. No. 14/022,147, 10 pages.
Wu et al., "Apparatus, Method and Article for Providing Locations of Power Storage Device Collection, Charging and Distribution Machines," Office Action dated Mar. 5, 2014, for U.S. Appl. No. 14/022,147, 12 pages.
Wu et al., "Apparatus, Method and Article for Providing Locations of Power Storage Device Collection, Charging and Distribution Machines," Office Action dated Nov. 27, 2013, for U.S. Appl. No. 13/559,333, 19 pages.
Wu et al., "Apparatus, Method and Article for Security of Vehicles," U.S. Appl. No. 61/557,176, filed Nov. 8, 2011, 37 pages.
Wu, "Battery Configuration for an Electric Vehicle," U.S. Appl. No. 14/057,405, filed Oct. 18, 2013, 38 pages.
"Inrunner," retreived from URL=http://en.wikipedia.org/w/index.php?title=Inrunner&printable=yes on Sep. 28, 2011, 1 page.
"Outrunner," retreived from URL=http://en.wikipedia.org/w/index.php?title=Outrunner&printable=yes on Sep. 16, 2011, 2 pages.
Chen et al., "Adjusting Electric Vehicle Systems Based on an Electrical Energy Storage Device Thermal Profile," U.S. Appl. No. 61/862,854, filed Aug. 6, 2013, 74 pages.
Chen et al., "Apparatus, Method and Article for Providing Vehicle Diagnostic Data," Office Action dated Apr. 9, 2014, for U.S. Appl. No. 14/022,134, 20 pages.
Chen et al., "Systems and Methods for Powering Electric Vehicles Using a Single or Multiple Power Cells," U.S. Appl. No. 61/862,852, filed Aug. 6, 2013, 46 pages.
International Search Report and Written Opinion for corresponding International Patent Application No. PCT/US2012/048344, dated Feb. 28, 2013, 9 pages.
International Search Report and Written Opinion for corresponding International Application No. PCT/US2012/059931, dated Mar. 29, 2013, 13 pages.
Luke et al., "Portable Electrical Energy Storage Device," U.S. Appl. No. 61/872,126, filed Aug. 30, 2013, 39 pages.
Luke et al., "Electric Device Drive Assembly and Cooling System," U.S. Appl. No. 61/615,144, filed Mar. 23, 2012, 43 pages.
Luke et al., "Thermal Management of Components in Electric Motor Drive Vehicles," Office Action dated Apr. 2, 2014, for U.S. Appl. No. 13/559,259, 11 pages.
Microchip, "AN885: Brushless DC (BLDC) Motor Fundamentals," Microchip Technology Inc., 2003, 19 pages.
Wu et al., "Apparatus, Method and Article for Power Storage Device Failure Safety," U.S. Appl. No. 14/071,134, filed Nov. 4, 2013, 68 pages.
Wu et al., "Apparatus, Method and Article for Power Storage Device Failure Safety," Office Action for U.S. Appl. No. 14/071,134, dated Feb. 12, 2014, 14 pages.
International Search Report and Written Opinion for corresponding International Application No. PCT/US2014/024757, dated Jul. 11, 2014, 15 pages.

Chen et al., "Apparatus, Method and Article for Providing Vehicle Diagnostic Data," Notice of Allowance dated Jul. 9, 2014, for U.S. Appl. No. 14/022,134, 10 pages.
Chen et al., "Apparatus, Method and Article for Providing Vehicle Diagnostic Data," Office Action dated Jun. 18, 2014, for U.S. Appl. No. 13/559,390, 16 pages.
Chen et al., "Apparatus, Method and Article for Providing Vehicle Diagnostic Data," Notice of Allowance dated Nov. 3, 2014, for U.S. Appl. No. 13/559,390, 10 pages.
Chen et al., "Apparatus, Method and Article for Providing Vehicle Diagnostic Data," U.S. Appl. No. 14/609,201, filed Jan. 29, 2015, 61 pages.
International Search Report and Written Opinion for corresponding International Application No. PCT/US2013/065704, dated Feb. 13, 2014, 13 pages.
International Search Report and Written Opinion, for corresponding International Application No. PCT/US2014/021369, dated Jul. 2, 2014, 14 pages.
International Search Report and Written Opinion, for corresponding International Application No. PCT/US2014/022610, dated Jul. 10, 2014, 12 pages.
International Search Report and Written Opinion for corresponding International Application No. PCT/US2014/023539, dated Sep. 4, 2014, 12 pages.
International Search Report and Written Opinion for corresponding International Application No. PCT/US2014/050001, dated Nov. 18, 2014, 9 pages.
Japanese Office Action with English Translation, dated Dec. 16, 2014, for corresponding JP Application No. 2014-523013, 11 pages.
Luke et al., "Apparatus, Method and Article for Authentication, Security and Control of Portable Charging Devices and Power Storage Devices, Such as Batteries," Office Action dated Jun. 26, 2014, for U.S. Appl. No. 14/017,090, 19 pages.
Luke et al., "Detectible Indication of an Electric Motor Vehicle Standby Mode," Notice of Allowance for U.S. Appl. No. 13/646,320, dated Apr. 10, 2014, 8 pages.
Luke et al., "Apparatus, Method and Article for Authentication, Security and Control of Power Storage Devices, Such as Batteries," Office Action dated Aug. 19, 2014, for U.S. Appl. No. 13/559,038, 14 pages.
Luke et al., "Apparatus, Method and Article for Authentication, Security and Control of Power Storage Devices, Such as Batteries," Office Action dated Aug. 21, 2014, for U.S. Appl. No. 14/023,344, 13 pages.
Luke et al., "Dynamically Limiting Vehicle Operation for Best Effort Economy," Office Action for U.S. Appl. No. 13/559,264, dated Aug. 19, 2014, 26 pages.
Luke et al., "Dynamically Limiting Vehicle Operation for Best Effort Economy," Office Action for U.S. Appl. No. 13/559,264, dated Jan. 21, 2015, 31 pages.
Taylor et al., "Apparatus, Method and Article for Physical Security of Power Storage Devices in Vehicles," Office Action dated Dec. 10, 2014, for U.S. Appl. No. 14/012,845, 13 pages.
Wu et al., "Apparatus, Method and Article for Security of Vehicles," Office Action dated Oct. 2, 2014, for U.S. Appl. No. 13/671,144, 20 pages.
Wu et al., "Apparatus, Method and Article for a Power Storage Device Compartment," Office Action for U.S. Appl. No. 13/559,125, dated Sep. 9, 2014, 28 pages.
Wu et al., "Apparatus, Method and Article for Providing to a User Device Information Regarding Availability of Portable Electrical Energy Storage Devices at a Portable Electrical Energy Storage Device Collection, Charging and Distribution Machine," Notice of Allowance dated Jun. 30, 2014, for U.S. Appl. No. 14/022,140, 5 pages.
Wu et al., "Apparatus, Method and Article for Providing to a User Device Information Regarding Availability of Portable Electrical Energy Storage Devices at a Portable Electrical Storage Device Collection, Charging and Distribution Machine," U.S. Appl. No. 14/511,137, filed Oct. 9, 2014, 56 pages.

(56) References Cited

OTHER PUBLICATIONS

Wu et al., "Apparatus, Method and Article for Providing Locations of Power Storage Device Collection, Charging and Distribution Machines," Notice of Allowance dated Jul. 10, 2014, for U.S. Appl. No. 13/559,333, 9 pages.
Wu et al., "Apparatus, Method and Article for Providing Locations of Power Storage Device Collection, Charging and Distribution Machines," Office Action dated Aug. 6, 2014, for U.S. Appl. No. 14/022,147, 17 pages.
Wu et al., "Apparatus, Method and Article for Providing Locations of Power Storage Device Collection, Charging and Distribution Machines," Notice of Allowance dated Nov. 25, 2014, for U.S. Appl. No. 14/022,147, 5 pages.
Wu et al., "Apparatus, Method and Article for Power Storage Device Failure Safety," Office Action dated Jun. 9, 2014, for U.S. Appl. No. 14/071,134, 15 pages.
Chinese Office Action dated Jul. 17, 2015, for corresponding CN Application No. 201280047017.1, 15 pages.
Chinese Office Action dated Jul. 30, 2015, for corresponding CN Application No. 201280046871.6, 25 pages.
Communication pursuant to Rules 70(2) and 70a(2) EPC, for corresponding European Patent Application No. 12817141,0, dated Aug. 20, 2015, 1 page.
Communication pursuant to Rules 70(2) and 70a(2) EPC, for corresponding European Patent Application No. 12817696.3, dated Aug. 21, 2015, 1 page.
Communication pursuant to Rules 70(2) and 70a(2) EPC, for corresponding European Patent Application No. 12818447.0, dated Aug. 21, 2015, 1 page.
Extended European Search Report dated Aug. 3, 2015, for corresponding EP Application No. 12817141.0, 9 pages.
Extended European Search Report dated Aug. 5, 2015, for corresponding EP Application No. 12818447.0, 17 pages.
Extended European Search Report dated Aug. 5, 2015, for corresponding EP Application No. 12817392.9, 9 pages.
Extended European Search Report dated Aug. 5, 2015, for corresponding EP Application No. 12817696.3, 13 pages.
International Preliminary Report on Patentability dated Sep. 8, 2015, for corresponding International Application No. PCT/US2014/021369, 9 pages.
Japanese Office Action dated Sep. 1, 2015, for corresponding JP Application No. 2014-523005, with English Translation, 11 pages.
Japanese Office Action dated Sep. 8, 2015, for corresponding JP Application No. 2014-523018, with English Translation, 12 pages.
Luke et al., "Apparatus, Method and Article for Authentication, Security and Control of Power Storage Devices, Such as Batteries," Notice of Allowance dated Aug. 3, 2015, for U.S. Appl. No. 13/559,038, 13 pages.
Luke et al., "Apparatus, Method and Article for Redistributing Power Storage Devices, Such as Batteries, Between Collection, Charging and Distribution Machines," Office Action dated Sep. 14, 2015, for U.S. Appl. No. 13/559,091, 32 pages.
Taiwanese Office Action with English Translation dated Aug. 19, 2015, for corresponding TW Application No. 101127036, 25 pages.
Extended European Search Report dated Oct. 1, 2015, for corresponding EP Application No. 12818033.8-1807, 9 pages.
Chinese Office Action with English Translation dated Jul. 30, 2015, for corresponding CN Application No. 201280047050.4, 12 pages.
Taiwanese Office Action with English Translation dated Nov. 25, 2015, for corresponding TW Application No. 103108770, 7 pages.
Office Action received for Vietnamese Patent Application No. 1-2005-03777, Applicant: Gogoro Inc., dated Mar. 12, 2014, 2 pages.

\* cited by examiner

APPARATUS, METHOD AND ARTICLE FOR PROVIDING INFORMATION REGARDING A VEHICLE VIA A MOBILE DEVICE

BACKGROUND

Technical Field

The present disclosure generally relates to the distribution of rechargeable electrical power storage devices (e.g., secondary batteries, supercapacitors or ultracapacitors), which may be suitable for use in a variety of fields or applications, for instance transportation and non-transportation uses.

Description of the Related Art

There are a wide variety of uses or applications for portable electrical power storage devices.

One such application is in the field of transportation. Hybrid and all electrical vehicles are becoming increasingly common. Such vehicles may achieve a number of advantages over traditional internal combustion engine vehicles. For example, hybrid or electrical vehicles may achieve higher fuel economy and may have little or even zero tail pipe pollution. In particular, all electric vehicles may not only have zero tail pipe pollution, but may be associated with lower overall pollution. For example, electrical power may be generated from renewable sources (e.g., solar, hydro). Also for example, electrical power may be generated at generation plants that produce no air pollution (e.g., nuclear plants). Also for example, electrical power may be generated at generation plants that burn relatively "clean burning" fuels (e.g., natural gas), which have higher efficiency than internal combustion engines, and/or which employ pollution control or removal systems (e.g., industrial air scrubbers) which are too large, costly or expensive for use with individual vehicles.

Personal transportation vehicles such as combustion engine powered scooters and/or motorbikes are ubiquitous in many places, for example in the many large cities of Asia. Such scooters and/or motorbikes tend to be relatively inexpensive, particularly as compared to automobiles, cars or trucks. Cities with high numbers of combustion engine scooters and/or motorbikes also tend to be very densely populated and suffer from high levels of air pollution. When new, many combustion engine scooters and/or motorbikes provide a relatively low polluting source of personal transportation. For instance, such scooters and/or motorbikes may have higher mileage ratings than larger vehicles. Some scooters and/or motorbikes may even be equipped with basic pollution control equipment (e.g., catalytic converter). Unfortunately, factory specified levels of emission are quickly exceeded as the scooters and/or motorbikes are used and either not maintained and/or as the scooters and/or motorbikes are modified, for example by intentional or unintentional removal of catalytic converters. Often owners or operators of scooters and/or motorbikes lack the financial resources or the motivation to maintain their vehicles.

It is known that air pollution has a negative effect on human health, being associated with causing or exacerbating various diseases (e.g., various reports the air pollution to emphysema, asthma, pneumonia, cystic fibrosis as well as various cardiovascular diseases). Such diseases take large numbers of lives and severely reduce the quality of life of countless others.

BRIEF SUMMARY

Zero tail pipe pollution alternatives to combustion engines would greatly benefit air quality, and hence the health of large populations. While the zero tail pipe emissions benefit of all-electric vehicles are appreciated, adoption of all-electric vehicles by large populations has been slow. One of the reasons appears to be the cost, particularly the cost of secondary batteries. Another one of the reasons appears to be the limited driving range available on a single charge of a battery, limited locations to recharge secondary batteries, and the relatively long time (e.g., multiple hours) necessary to recharge a secondary battery when depleted.

The approaches described herein may address some of the issues which have limited adoption of zero tail pipe emission technology, particularly in densely crowded cities, and in populations with limited financial resources.

For example, some of the approaches described herein employ collection, charging and distribution machines, which may otherwise be termed as kiosks or vending machines, to collect, charge and distribute electrical power storage devices (e.g., batteries, supercapacitors or ultracapacitors). Such machines may be distributed about a city or other region at a variety of locations, such as convenience stores or existing gas or petrol filling stations.

The collection, charging and distribution machines may maintain a stock of fully charged or almost fully charged electrical storage devices for use by end users. The collection, charging and distribution machines may collect, receive or otherwise accept depleted electrical storage devices, for example as returned by end users, recharging such for reuse by subsequent end users.

Thus, as a battery or other electrical power storage device reaches or approaches the end of its stored charge, an end user may simply replace, exchange or otherwise swap batteries or other electrical power storage devices at the collection, charging and distribution machines. This may address issues related to cost, as well as limited range and locations to recharge electrical power storage devices, and relatively long recharging times.

As previously noted, secondary batteries and other electrical power storage devices are relatively expensive. Thus, it is beneficial to stock the least number of electrical power storage devices possible at a particular collection, charging and distribution machine, while still ensuring that demand for such is satisfied.

For these reasons, the ability to have electrical power storage devices available and the management of the availability of such devices and systems for making such devices available, including wireless communication of information to manage such systems and regarding the vehicle's that use such systems is important to commercial success of any such endeavor. Thus, a number of approaches are described herein that make electrical power storage devices available, manage the availability of such devices, manage systems for making such devices available and provide information regarding a vehicle via a mobile device.

A method in a system for providing information regarding a vehicle may be summarized as including receiving, by one or more computer processors of a user mobile device of the system for providing information regarding a vehicle, first information regarding diagnostics or status of the vehicle; receiving, by one or more computer processors of the user mobile device of the system for providing information regarding a vehicle, second information regarding usage history of the vehicle; in response to the receiving the first information regarding diagnostics or status of the vehicle and the second information regarding usage history of the vehicle, processing, by one or more computer processors of the user mobile device of the system for providing information regarding a vehicle, the received first information and the received second information; and based on the received first information and the received second information being processed, communicating to a user authenticated as associated with the vehicle, by one or more computer processors of the user mobile device of the system for providing information regarding a vehicle, processed information that is based at least in part on the received first information and the received second information.

The vehicle may be an electrically powered vehicle or a hybrid electrically powered vehicle. The first information regarding diagnostics or status of the vehicle and the second information regarding usage history of the vehicle may each include at least some information regarding one or more of: status or condition of the vehicle, status or condition of one or more systems of the vehicle, a number of vehicles owned by a user, customizable features of the vehicle, settings of customizable features of the vehicle, condition or status of an engine or motor of the vehicle, one or more electrical systems of the vehicle, health of the vehicle, security of the vehicle, locks of the vehicle, transmission system of the vehicle, maintenance of the vehicle, recommended maintenance of the vehicle, scheduled maintenance of the vehicle, brake pad condition of the vehicle, status of one or more vehicle lights, engine temperature of the vehicle, mileage of the vehicle, one or more wheels of the vehicle, one or more tires of the vehicle, tire wear of one or more tires of the vehicle, tire pressure of one or more tires of the vehicle, speed of the vehicle, statistics regarding different speeds of the vehicle over time, one or more fluid levels of the vehicle, condition or status of an electrical energy storage device of the vehicle, a dashboard of the vehicle, a dashboard display of the vehicle, a current state of a dashboard display of the vehicle, configurable settings of a customizable dashboard display of the vehicle, information stored on a computer readable medium coupled to a portable electrical energy storage device of the vehicle, configurable vehicle lighting, configurable vehicle lighting status, configurable vehicle lighting settings, current odometer reading of the vehicle, historical usage statistics of the vehicle, historical usage statistics regarding a electrical energy storage device of the vehicle, historical usage statistics regarding a motor of the vehicle, historical usage statistics regarding efficiency of the vehicle, geographic travel statistics of the vehicle, a current location of the vehicle, previous locations of the vehicle, target efficiency of the vehicle, recommended settings of the vehicle, user account settings of a user associated with the vehicle, portable electrical energy storage devices for the vehicle, available portable electrical energy storage devices for the vehicle, locations of one or more available portable electrical energy storage devices for the vehicle, one or more collection, charging and distribution machines for portable electrical energy storage devices for the vehicle, portable electrical energy storage device exchange history (e.g., locations and number of exchanges) at one or more collection, charging and distribution machines for portable electrical energy storage devices for the vehicle, and locations of one or more collection, charging and distribution machines for portable electrical energy storage devices for the vehicle. The receiving the first information regarding diagnostics or status of the vehicle may include receiving the first information regarding diagnostics or status of the vehicle from a different remote source than that from which the second information regarding usage history of the vehicle is received. The receiving the first information regarding diagnostics or status of the vehicle and the receiving the second information regarding usage history of the vehicle may include receiving either the first information or the second information over a short range wireless connection between the vehicle and the user mobile device or over a different wireless connection to the user mobile device from a remote vehicle data information management system. The processing the received first information and the received second information may include: preparing received data regarding portable electrical energy storage device exchange history associated with the user or the vehicle for presentation on a display of the mobile device; and preparing data for presentation on the display of the mobile device to alert the user of offers regarding, or availability of, vehicle portable electrical energy storage devices based at least in part on the received data regarding portable electrical energy storage device exchange history associated with the user or the vehicle. The data regarding portable electrical energy storage device exchange history may be data received via a short range wireless connection between the vehicle and the user mobile device from a memory module attached to a portable electrical energy storage device that powers a motor of the vehicle. The data regarding portable electrical energy storage device exchange history may be data received from the remote vehicle data information management system via a wireless connection to the user mobile device. The data regarding portable electrical energy storage device exchange history may be data received originating from one or more collection, charging and distribution machines for portable electrical energy storage devices for the vehicle. The processing the received first information and the received second information may include: selecting first data from the first information regarding diagnostics or status of the vehicle; selecting second data from the second information regarding usage history of the vehicle based on the selected first data from the first information regarding diagnostics or status of the vehicle; and generating third information based on the selected first data and the selected second data to be presented to the user via the user mobile device. The selected first data from the first information regarding diagnostics or status of the vehicle may include data regarding a current charge level of a portable electrical energy storage device of the vehicle and the selected second data from the second information regarding usage history of the vehicle includes data regarding driving behavior associated with the user, and wherein the generating third information based on the selected first data and the selected second data may include generating information regarding an estimate of how far in terms of distance, or how long in terms of time, the current charge level of the portable electrical energy storage device will last based on the data regarding driving behavior associated with the user. The method may further include presenting, by one or more computer processors of the user mobile device, the generated third information on the mobile device. The method may further include communicating, by one or more computer processors of the user mobile device one or more of: the selected first data from the first information regarding diagnostics or status of the vehicle, and the selected second data from the second information regarding usage history of the vehicle, to a memory module attached to a portable electrical energy storage device that powers a motor of the vehicle. The receiving the first information regarding diagnostics or status of the vehicle or the receiving the second information regarding usage history of the vehicle may include receiving either the first information or the second information over a short range wireless connection between the vehicle and the user mobile device from a memory module attached to a portable electrical energy storage device that powers a motor of the vehicle. The method may further include communicating, by one or more computer processors of the user mobile device, one or more of: the first information, the second information, and the processed information that is based at least in part on the received first information and the received second information, over a short range wireless connection between the vehicle and the user mobile device to a memory module attached to a portable electrical energy storage device that powers a motor of the vehicle. The communicating to the user may include presenting information on a display or via speakers of the user mobile device based on the processed information. The method may further include receiving, by one or more computer processors of the mobile device, input from the user related to one or more of: first information regarding diagnostics or status of the vehicle and the second information regarding usage history of the vehicle; and in response to the input received, selecting based on the input received, by one or more computer processors of the mobile device, data from one or more of: the received first information regarding diagnostics or status of the vehicle, and the received second information regarding usage history of the vehicle; preparing the selected data for presentation via the user mobile device based on specifications of or capabilities of the user mobile device; and presenting the prepared selected data on the display or via speakers of the user mobile device. The method may further include receiving, by one or more computer processors of the mobile device, input related to a change to a setting or a configuration of the vehicle; and wirelessly communicating to the vehicle, by one or more computer processors of the user mobile device, a change to a setting or a configuration of the vehicle based on the received input from the user related to the change to the setting or the configuration of the vehicle. The wirelessly communicating to the vehicle the change to the setting or the configuration may include wirelessly communicating to the vehicle, by one or more computer processors of the user mobile device, the change to the setting or the configuration of the vehicle based additionally on the received first information regarding diagnostics or status of the vehicle or the received second information regarding usage history of the vehicle. The receiving the input related to a change to a setting or a configuration of the vehicle may include receiving the input from a remote vehicle data information management system. The receiving the input related to a change to a setting or a configuration of the vehicle may include receiving the input via a wireless connection to the mobile device and from a memory module attached to a portable electrical energy storage device that powers a motor of the vehicle. The change to the setting or the configuration of the vehicle may be regarding one or more of: a selection regarding a customizable lighting pattern of lights of the vehicle and a selection regarding a customizable dashboard display of the vehicle.

A system for providing information regarding a vehicle may be summarized as including at least one computer processor; and at least one memory coupled to the computer processor, wherein the at least one computer processor is configured to: receive one or more of: first information regarding diagnostics or status of the vehicle and second information regarding usage history of the vehicle, the received information originating from a device of a user associated with the vehicle or a memory module attached to a portable electrical energy storage device that is configured to power a motor of the vehicle; and based on the received information, communicating third information that is based at least in part on the received first information or the received second information to a remote device.

The remote device may be a mobile device associated with the user or the vehicle. The remote device may be a collection, charging and distribution machine for portable electrical energy storage devices.

A non-transitory computer readable storage medium may be summarized as including computer executable instructions thereon that, when executed by one or more computer processors, cause the one or more computer processors to: receive information regarding status of a vehicle including a software or firmware update for updating a current status of software or firmware of the vehicle; and communicate the software or firmware update to the vehicle via one or more of: a module attached to a portable electrical energy storage device that powers a motor of the vehicle and a mobile device associated with the vehicle or a user of the vehicle.

The computer executable instructions thereon, when executed by one or more computer processors, may further cause the one or more computer processors to: receive, by one or more computer processors of the user mobile device of the system for providing information regarding a vehicle, information regarding usage history of the vehicle; in response to the receiving the information regarding usage history of the vehicle, processing the information regarding usage history of the vehicle to be presented on a user mobile device with other information regarding the vehicle received from a remote source different than a source of the information regarding usage history of the vehicle.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with vending apparatus, batteries, supercapacitors or ultracapacitors, power converters including but not limited to transformers, rectifiers, DC/DC power converters, switch mode power converters, controllers, and communications systems and structures and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device means any device capable of storing electrical power and releasing stored electrical power including but not limited to batteries, supercapacitors or ultracapacitors. Reference to batteries means chemical storage cell or cells, for instance rechargeable or secondary battery cells including but not limited to nickel cadmium alloy or lithium ion battery cells.

The headings and Abstract of the Disclosure provided herein are for convenience only and do not interpret the scope or meaning of the embodiments.

Figure 1:
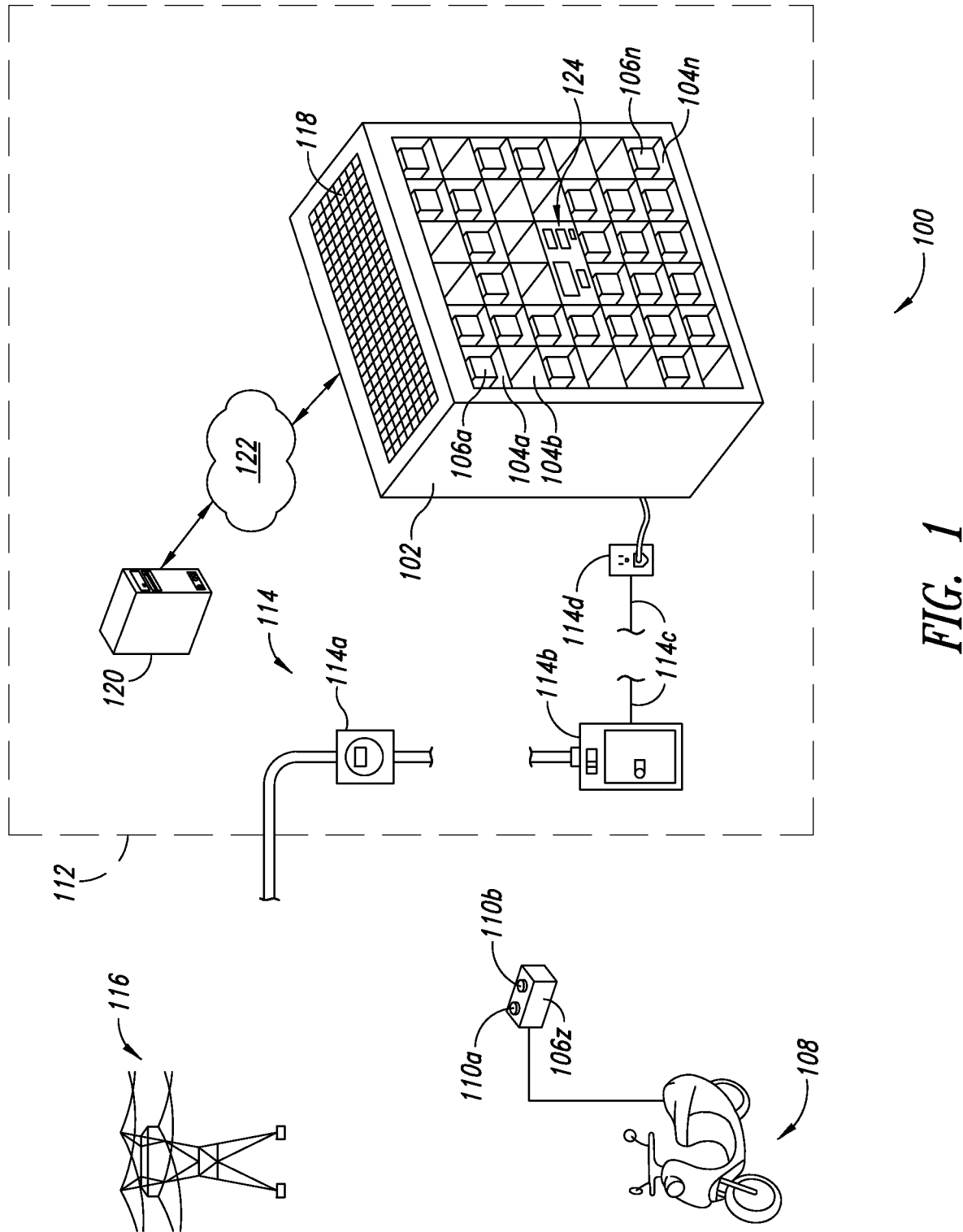
FIG. 1 is a schematic view of a collection, charging and distribution machine along with a number of electrical power storage devices according to one non-limiting illustrated embodiment, along with an electric scooter or motorbike, and an electrical service provided via an electrical grid.

FIG. 1 shows an environment 100 including a collection, charging and distribution machine 102, according to one illustrated embodiment.

The collection, charging and distribution machine 102 may take the form of a vending machine or kiosk. The collection, charging and distribution machine 102 has a plurality of receivers, compartments or receptacles 104*a*, 104*b*-104*n* (only three called out in FIG. 1, collectively 104) to removably receive portable electrical energy storage devices (e.g., batteries, supercapacitors or ultracapacitors) 106*a*-106*n* (collectively 106) for collection, charging and distribution. As illustrated in FIG. 1, some of the receivers 104 are empty, while other receivers 104 hold portable electrical energy storage devices 106. While FIG. 1 shows a single portable electrical energy storage device 106 per receiver 104, in some embodiments each receiver 104 may hold two or even more portable electrical energy storage devices 106. For example, each of the receivers 104 may be sufficiently deep to receive three portable electrical energy storage devices 106. Thus, for example, the collection, charging and distribution machine 102 illustrated in FIG. 1 may have a capacity capable of simultaneously holding 40, 80 or 120 portable electrical energy storage devices 106.

The portable electrical energy storage devices 106 may take a variety of forms, for example batteries (e.g., array of battery cells) or supercapacitors or ultracapacitors (e.g., array of ultracapacitor cells). For example, the portable electrical energy storage devices 106z may take the form of rechargeable batteries (i.e., secondary cells or batteries). The portable electrical energy storage devices 106z may, for instance, be sized to physically fit, and electrically power, personal transportation vehicles, such as all-electric scooters or motorbikes 108. As previously noted, combustion engine scooters and motorbikes are common in many large cities, for example in Asia, Europe and the Middle East. The ability to conveniently access charged batteries throughout a city or region may allow the use of all-electric scooters and motorbikes 108 in place of combustion engine scooters and motorbikes, thereby alleviating air pollution, as well as reducing noise.

The portable electrical energy storage devices 106 (only visible for portable electrical energy storage device 106z) may include a number of electrical terminals 110a, 110b (two illustrated, collectively 110), accessible from an exterior of the portable electrical energy storage device 106z. The electrical terminals 110 allow charge to be delivered from the portable electrical energy storage device 106z, as well as allow charge to be delivered to the portable electrical energy storage device 106z for charging or recharging the same. While illustrated in FIG. 1 as posts, the electrical terminals 110 may take any other form which is accessible from an exterior of the portable electrical energy storage device 106z, including electrical terminals positioned within slots in a battery housing.

The collection, charging and distribution machine 102 is positioned at some location 112 at which the collection, charging and distribution machine 102 is conveniently and easily accessible by various end users. The location may take any of a large variety of forms, for example, a retail environment such as a convenience store, supermarket, gas or petrol station, or service shop. Alternatively, the collection, charging and distribution machine 102 may stand alone at a location 112 not associated with an existing retail or other business, for example in public parks or other public places.

Thus, for example, collection, charging and distribution machines 102 may be located at each store of a chain of convenience stores throughout a city or region. Such may advantageously rely on the fact that convenience stores are often sited or distributed based on convenience to the target population or demographic. Such may advantageously rely on pre-existing leases on storefronts or other retail locations to allow an extensive network of collection, charging and distribution machines 102 to be quickly developed in a city or region. Quickly achieving a large network which is geographically well distributed to serve a target population enhances the ability to depend on such a system and likely commercial success of such an effort. Providing a system in which users who use the collection, charging and distribution machines (e.g., such as collection, charging and distribution machine 102) can be presented, on their mobile device, with information regarding their vehicle, the ability to change vehicle setting or configurations, and to receive alerts regarding maintenance of the vehicle and/or information regarding portable electrical energy storage devices or collection, charging and distribution machines, also enhances the ability to depend on such a system and likely commercial success of such an effort. The ability to present to users, on their mobile devices, information regarding their vehicle, the ability to change vehicle setting or configurations, and to receive alerts regarding maintenance of the vehicle and/or information regarding portable electrical energy storage devices or collection, charging and distribution machines is addressed herein.

The location 112 may include an electrical service 114 to receive electrical power from a generating station (not shown) for example via a grid 116. The electrical service 114 may, for example, include one or more of an electrical service meter 114a, a circuit panel (e.g., circuit breaker panel or fuse box) 114b, wiring 114c, and electrical outlet 114d. Where the location 112 is an existing retail or convenience store, the electrical service 114 may be an existing electrical service, so may be somewhat limited in rating (e.g., 120 volts, 240 volts, 220 volts, 230 volts, 15 amps).

Neither the operator of the retail location 112, nor the owner, distributor or operator of the collection, charging and distribution machine 102 may wish to bear the costs of upgrading the electrical service 114. Yet, quick charging is desired in order to maintain an adequate supply of portable electrical energy storage devices 106 available for use by end users. The ability to quickly charge while maintaining existing or otherwise limited rated electrical service is addressed in U.S. provisional patent application Ser. No. 61/511,900, entitled "APPARATUS, METHOD AND ARTICLE FOR COLLECTION, CHARGING AND DISTRIBUTING POWER STORAGE DEVICES, SUCH AS BATTERIES" and filed Jul. 26, 2011.

Optionally, the collection, charging and distribution machine 102 may include or be coupled to a source of renewable electrical power. For example, where installed in an outside location the collection, charging and distribution machine 102 may include an array of photovoltaic (PV) cells 118 to produce electrical power from solar insolation. Alternatively, the collection, charging and distribution machine 102 may be electrically coupled to a microturbine (e.g., wind turbine) or PV array positioned elsewhere at the location 112, for instance on a roof top or pole mounted at a top of a pole (not shown).

The collection, charging and distribution machine 102 may be communicatively coupled to one or more remotely located computer systems, such as back end or back office systems (only one shown) 120. The back end or back office systems 120 may collect data from and/or control a plurality of collection, charging and distribution machine 102 distributed about an area, such as a city. The communications may occur over one or more communications channels including one or more networks 122, or non-networked communications channels. Communications may be over one or more wired communications channels (e.g., twisted pair wiring, optical fiber), wireless communications channels (e.g., radio, microwave, satellite, 801.11 compliant). Networked communications channels may include one or more local area networks (LANs), wide area networks (WANs), extranets, intranets, or the Internet including the Worldwide Web portion of the Internet.

The collection, charging and distribution machine 102 may include a user interface 124. The user interface may include a variety of input/output (I/O) devices to allow an end user to interact with the collection, charging and distribution machine 102. Various I/O devices are called out and described in reference to FIG. 2, which follows.

Figure 2:
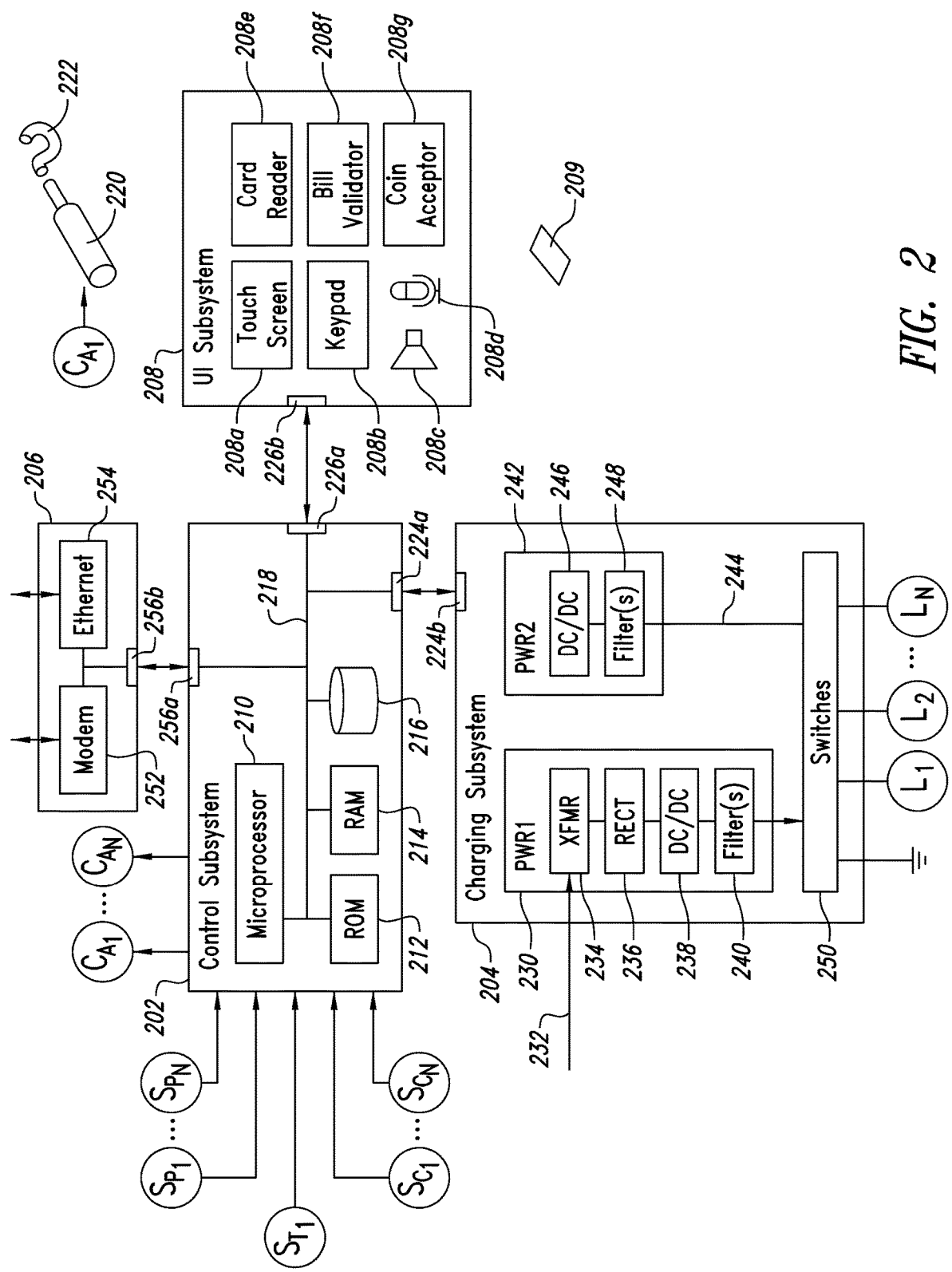
FIG. 2 is a block diagram of the collection, charging and distribution machine of FIG. 1, according to one non-limiting illustrated embodiment.

FIG. 2 shows the collection, charging and distribution machine 102 of FIG. 1, according to one illustrated embodiment.

The collection, charging and distribution machine 102 includes a control subsystem 202, a charging subsystem 204, a communications subsystem 206, and a user interface subsystem 208.

The control subsystem 202 includes a controller 210, for example a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 210 may take the form of a microprocessor (e.g., INTEL, AMD, ATOM). The control subsystem 202 may also include one or more non-transitory processor- or computer-readable storage media, for example read only memory (ROM) 212, random access memory (RAM) 214, and data store 216 (e.g., solid-state storage media such as flash memory or EEPROM, spinning storage media such as hard disk). The non-transitory processor- or computer-readable storage media 212, 214, 216 may be in addition to any non-transitory storage medium (e.g., registers) which is part of the controller 210. The control subsystem 202 may include one or more buses 218 (only one illustrated) coupling various components together, for example one or more power buses, instruction buses, data buses, etc.

Figure 14:
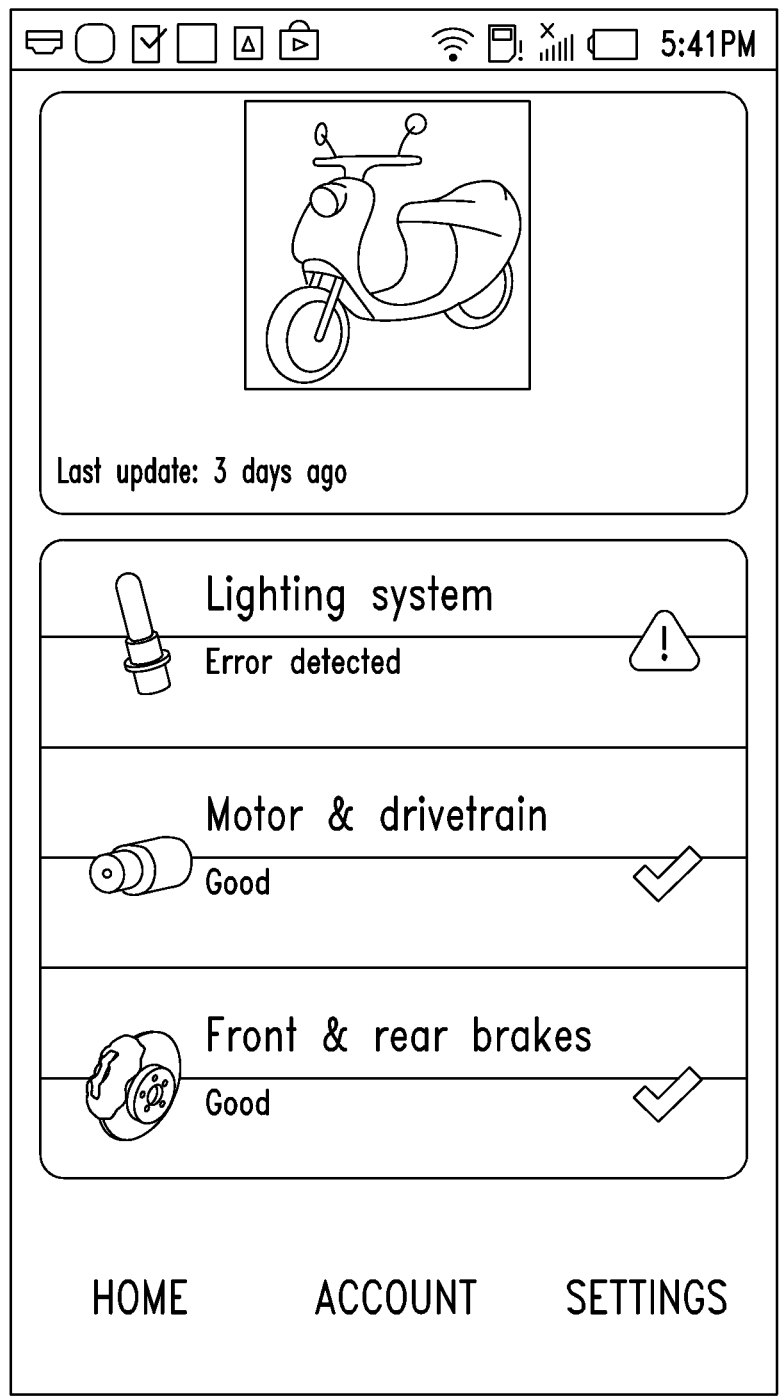
FIG. 14 is an example user interface of a user mobile device presenting an example user menu providing a diagnostic reports and menu choices regarding the diagnostic report, according to one non-limiting illustrated embodiment.
Figure 15:
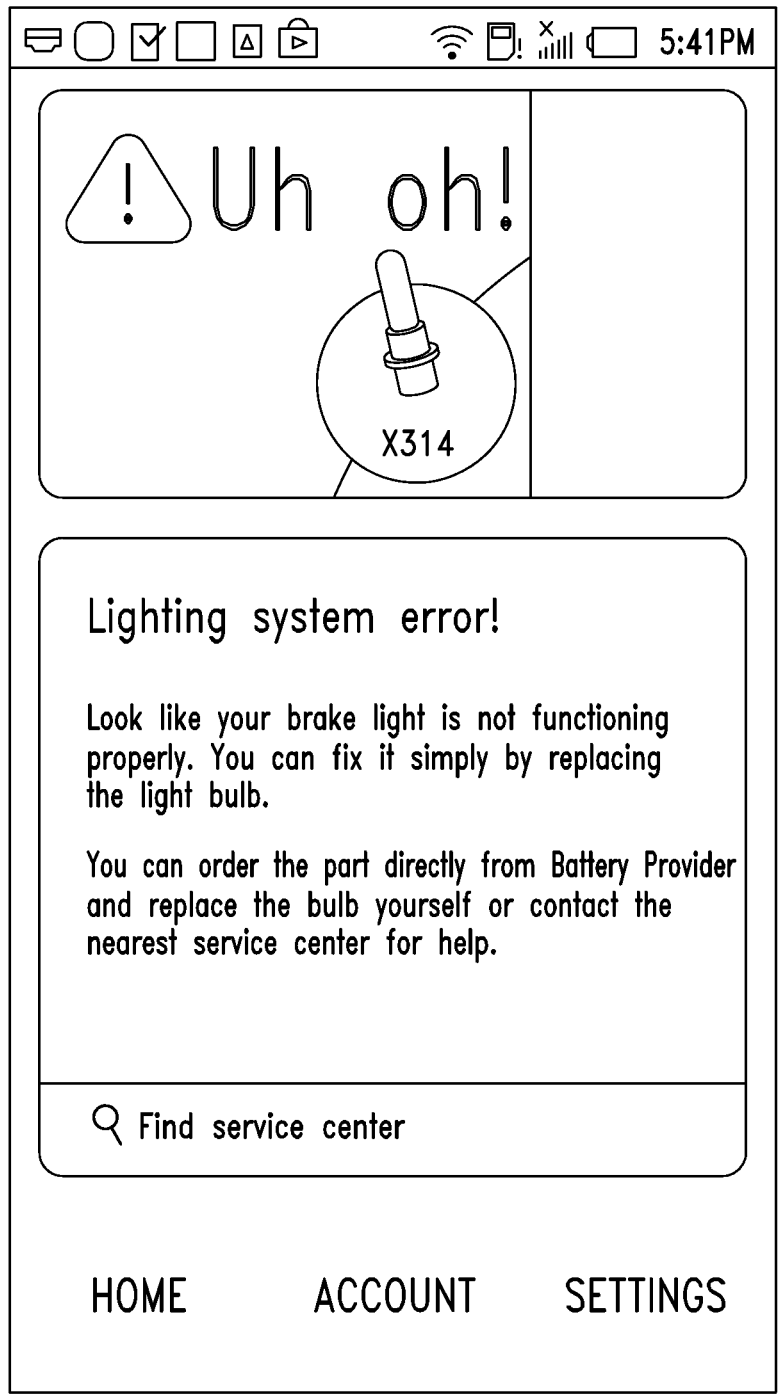
FIG. 15 is an example user interface of a user mobile device presenting an example user menu providing further information regarding an interactive vehicle diagnostics report based on user menu selection on the interactive vehicle diagnostics report, according to one non-limiting illustrated embodiment.
Figure 16:
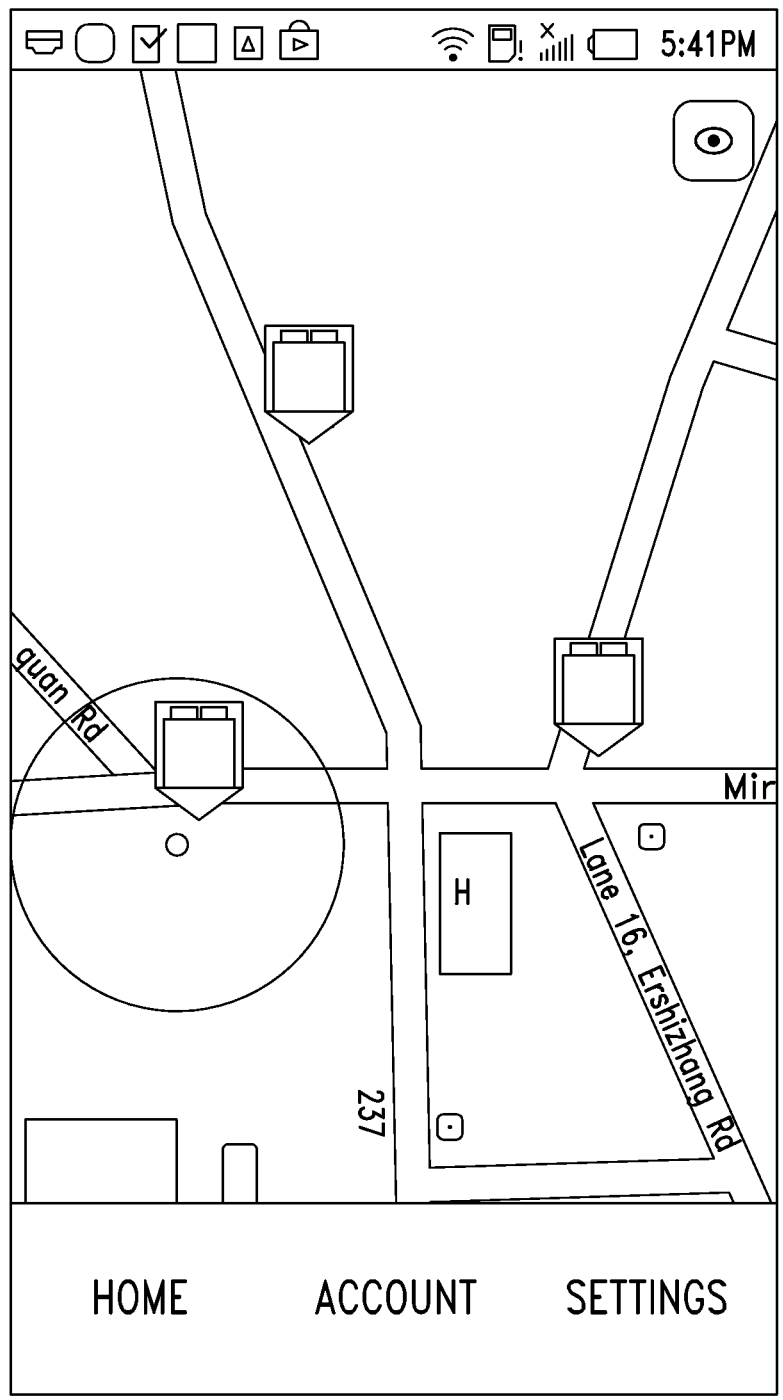
FIG. 16 is an example user interface of a user mobile device presenting an example user menu providing an interactive map indicating current user location and portable electrical power storage device collection and distribution machine locations, according to one non-limiting illustrated embodiment.

As illustrated, the ROM 212, or some other one of the non-transitory processor- or computer-readable storage media 212, 214, 216, stores instructions and/or data or values for variables or parameters. The sets of data may take a variety of forms, for example a lookup table, a set of records in a database, etc. The instructions and sets of data or values are executable by the controller 210. Execution of the instructions and sets of data or values causes the controller 210 to perform specific acts to cause the collection, charging and distribution machine 102 to collect, charge, and distribute portable energy storage devices. Specific operation of the collection, charging and distribution machine 102 is described herein and also below with reference to various flow diagrams (FIGS. 14-16).

The controller 210 may use RAM 214 in a conventional fashion, for volatile storage of instructions, data, etc. The controller 210 may use data store 216 to log or retain information, for example telemetric information related to collection, charging and/or distribution or collection of the portable electric power storage devices 106 and/or operation of the collection, charging and distribution machine 102 itself. The instructions are executable by the controller 210 to control operation of the collection, charging and distribution machine 102 in response to end user or operator input, and using data or values for the variables or parameters.

The control subsystem 202 receives signals from various sensors and/or other components of the collection, charging and distribution machine 102 which include information that characterizes or is indicative of operation, status, or condition of such other components. Sensors are represented in FIG. 2 by the letter S appearing in a circle along with appropriate subscript letters.

For example, one or more position sensors $S_{P1}$-$S_{PN}$ may detect the presence or absence of portable electrical power storage device 106 at each of the receivers 104. The position sensors $S_{P1}$-$S_{PN}$ may take a variety of forms. For example, the position sensors $S_{P1}$-$S_{PN}$ may take the form of mechanical switches that are closed, or alternatively opened, in response to contact with a portion of a respective portable electrical power storage device 106 when the portable electrical power storage device 106 is inserted into the receiver 104. Also for example, the position sensors $S_{P1}$-$S_{PN}$ may take the form of optical switches (i.e., optical source and receiver) that are closed, or alternatively opened, in response to contact with a portion of a respective portable electrical power storage device 106 when the portable electrical power storage device 106 is inserted into the receiver 104. Also for example, the position sensors $S_{P1}$-$S_{PN}$ may take the form of electrical sensors or switches that are closed, or alternatively opened, in response to detecting a closed circuit condition created by contact with the terminals 110 of a respective portable electrical power storage device 106 when the portable electrical power storage device 106 is inserted into the receiver 104, or an open circuit condition that results from the lack of a respective portable electrical power storage device 106 in the receiver 104. These examples are intended to be non-limiting, and it is noted that any other structures and devices for detecting the presence/absence, the availability, or even the insertion of the portable electrical power storage devices 106 into receivers may be employed.

For example, one or more charge sensors $S_{C1}$-$S_{CN}$ may detect charge of the portable electrical power storage devices 106 at each of the receivers 104. Charge sensors $S_{C1}$-$S_{CN}$ may detect the amount of charge stored by the portable electrical power storage devices 106. Charge sensors $S_{C1}$-$S_{CN}$ may additionally detect an amount of charge and/or rate of charging being supplied to ones of the portable electrical power storage devices 106 at each of the receivers 104. Such may allow assessment of current (i.e., temporal) charge condition or status of each portable electrical power storage device 106, as well as allow feedback control over charging of same, including control over rate of charging. Charge sensors $S_{C1}$-$S_{CN}$ may include any variety of current and/or voltage sensors.

For example, one or more temperature sensors $S_{T1}$ (only one shown) may detect or sense a temperature at the receivers 104 or in the ambient environment.

The control subsystem 202 provides signals to various actuators and/or other components responsive to control signals, which signals include information that characterizes or is indicative of an operation the component is to perform or a state or condition in which the components should enter. Control signals, actuators or other components responsive to control signals are represented in FIG. 2 by the letter C appearing in a circle along with appropriate subscript letters.

For example, one or more engine control signals $C_{A1}$-$C_{AN}$ may affect the operation of one or more actuators 220 (only one illustrated). For instance, a control signal $C_{A1}$ may cause movement of an actuator 220 between a first and a second position or change a magnetic field produced by the actuator 220. The actuator 220 may take any of a variety of forms, including but not limited to a solenoid, an electric motor such as a stepper motor, or an electromagnet. The actuator 220 may be coupled to operate a latch, lock or other retainer mechanism 222. The latch, lock or other retainer mechanism 222 may selectively secure or retain one or more portable electrical power storage devices 106 (FIG. 1) in the receiver 104 (FIG. 1). For instance, the latch, lock or other retainer mechanism 222 may physically couple to a complementary structure that is part of a housing of the portable electrical power storage devices 106 (FIG. 1). Alternatively, the latch, lock or other retainer mechanism 222 may magnetically couple to a complementary structure that is part of a housing of the portable electrical power storage devices 106 (FIG. 1). Also for instance, the latch, lock or other mechanism may open a receiver 104 (FIG. 1), or may allow a receiver 104 to be opened, to receive a partially or fully discharged portable electrical power storage device 106 for charging. For example, the actuator may open and/or close a door to the receiver 104 (FIG. 1), to selectively provide access to a portable electrical power storage device 106 (FIG. 1) received therein. Also for example, the actuator may open and/or close a latch or lock, allowing an end user to open and/or close a door to the receiver 104 (FIG. 1), to selectively provide access to a portable electrical power storage device 106 (FIG. 1) received therein.

The control subsystem 202 may include one or more ports 224a to provide control signals to one or more ports 224b of the charging subsystem 204. The ports 224a, 224b may provide bi-directional communications. The control subsystem 202 may include one or more ports 226a to provide control signals to one or more ports 226b of the user interface subsystem 208. The ports 226a, 226b may provide bi-directional communications.

The charging subsystem 204 includes various electrical and electronic components to charge portable electrical power storage devices 106 when positioned or received in the receivers 104. For example, the charging subsystem 204 may include one or more power buses or power bus bars, relays, contactors or other switches (e.g., insulated gate bipolar transistors or IGBTs, metal oxide semiconductor transistors or MOSFETs), rectifier bridge(s), current sensors, ground fault circuitry, etc. The electrical power is supplied via contacts that can take any of a variety of forms, for instance terminals, leads, posts, etc. The contacts allow electrical coupling of various components. Some possible implementations are illustrated in FIG. 2. Such is not intended to be exhaustive. Additional components may be employed while other components may be omitted.

The illustrated charging subsystem 102 includes a first power converter 230 that receives electrical power from the electrical service 114 (FIG. 1) via a line or cord 232. The power will typically be in the form of single, two or three phase AC electrical power. As such, the first power converter 230 may need to convert and otherwise condition the electrical power received via the electrical services 114 (FIG. 1), for example for rectifying an AC waveform to DC, transforming voltage, current, phase, as well as reducing transients and noise. Thus, the first power converter 230 may include a transformer 234, rectifier 236, DC/DC power converter 238, and filter(s) 240.

The transformer 234 may take the form of any variety of commercially available transformers with suitable ratings for handling the power received via the electrical service 114 (FIG. 1). Some embodiments may employ multiple transformers. The transformer 234 may advantageously provide galvanic isolation between the components of the collection, charging and distribution machine 102 and the grid 116 (FIG. 1). The rectifier 236 may take any of variety of forms, for example a full bridge diode rectifier or a switch mode rectifier. The rectifier 236 may be operated to transform AC electrical power to DC electrical power. The DC/DC power converter 238 may be any of a large variety of forms. For example, DC/DC power converter 238 may take the form of a switch mode DC/DC power converter, for instance employing IGBTs or MOSFETs in a half or full bridge configuration, and may include one or more inductors. The DC/DC power converter 238 may have any number of topologies including a boost converter, buck converter, synchronous buck converter, buck-boost converter or flyback converter. The filter(s) 240 may include one or more capacitors, resistors, Zener diodes or other elements to suppress voltage spikes, or to remove or reduce transients and/or noise.

The illustrated charging subsystem 102 may also receive electrical power from a renewable power source, for example the PV array 118 (FIG. 1). Such may be converted or conditioned by the first power converter 230, for example being supplied directly to the DC/DC power converter 238, bypassing the transformer 234 and/or rectifier 236. Alternatively, the illustrated charging subsystem 102 may include a dedicated power converter to convert or otherwise condition such electrical power.

The illustrated charging subsystem 102 may optionally include second power converter 242 that receives electrical power from one or more portable electrical power storage devices 106 (FIG. 1) via one or more lines 244, for charging other ones of the portable electrical power storage devices 106. As such, the second power converter 242 may need to convert and/or otherwise condition the electrical power received from portable electrical power storage devices 106, for example optionally transforming voltage or current, as well as reducing transients and noise. Thus, the second power converter 242 may optionally include a DC/DC power converter 246 and/or filter(s) 248. Various types of DC/DC power converters and filters are discussed above.

The illustrated charging subsystem 102 includes a plurality of switches 250 responsive to the control signals delivered via ports 224a, 224b from the control subsystem 202. The switches may be operable to selectively couple a first number or set of portable electrical power storage devices 106 to be charged from electrical power supplied by both the electrical service via the first power converter 230 and from electrical power supplied by a second number or set of portable electrical power storage devices 106. The first number or set of portable electrical power storage devices 106 may include a single portable electrical power storage device 106, two, or even more portable electrical power storage devices 106. The second number or set of portable electrical power storage devices 106 may include a single portable electrical power storage device 106, two, or even more portable electrical power storage devices 106. The portable electrical power storage devices 106 are represented in FIG. 2 as loads $L_1, L_2\text{-}L_N$.

The communications subsystem 206 may additionally include one or more communications modules or components which facilitate communications with the various components of a back end or back office system 120 (FIG. 1). The communications subsystem 206 may, for example, include one or more modems 252 or one or more Ethernet or other types of communications cards or components 254. A port 256a of the control subsystem 202 may communicatively couple the control subsystem 202 with a port 256b of the communications subsystem 206. The communications subsystem 206 may provide wired and/or wireless communications. The communications subsystem 206 may include one or more ports, wireless receivers, wireless transmitters or wireless transceivers to provide wireless signal paths to the various remote components or systems. The remote communications subsystem 206 may include one or more bridges or routers suitable to handle network traffic including switched packet type communications protocols (TCP/IP), Ethernet or other networking protocols.

The user interface system 208 includes one or more user input/output (I/O) components. For example, user interface system 208 may include a touch screen display 208a, operable to present information and a graphical user interface (GUI) to an end user and to receive indications of user selections. The user interface system 208 may include a keyboard or keypad 208b, and/or a cursor controller (e.g., mouse, trackball, trackpad) (not illustrated) to allow an end user to enter information and/or select user selectable icons in a GUI. The user interface system 208 may include a speaker 208c to provide aural messages to an end user and/or a microphone 208d to receive spoken user input such as spoken commands.

The user interface system 208 may include a card reader 208e to read information from card type media 209. The card reader 208e may take a variety of forms. For instance, the card reader 208e may take the form of, or include, a magnetic stripe reader for reading information encoded in a magnetic stripe carried by a card 209. For instance, the card reader 208e may take the form of, or include, a machine-readable symbol (e.g., barcode, matrix code) card reader for reading information encoded in a machine-readable symbol carried by a card 209. For instance, the card reader 208e may take the form of, or include, a smart card reader for reading information encoded in a non-transitory medium carried by a card 209. Such may, for instance, include media employing radio frequency identification (RFID) transponders or electronic payment chips (e.g., near filed communications (NFC) chips). Thus, the card reader 208e may be able to read information from a variety of card media 209, for instance credit cards, debit cards, gift cards, prepaid cards, as well as identification media such as drivers licenses.

The user interface system 208 may include a bill acceptor 208f and a validator and/or coin acceptor 208g to accept and validate cash payments. Such may be highly useful in servicing populations who lack access to credit. Bill acceptor and validator 208f and/or coin acceptor 208g may take any variety of forms, for example those that are currently commercially available and used in various vending machines and kiosks.

Figure 3:
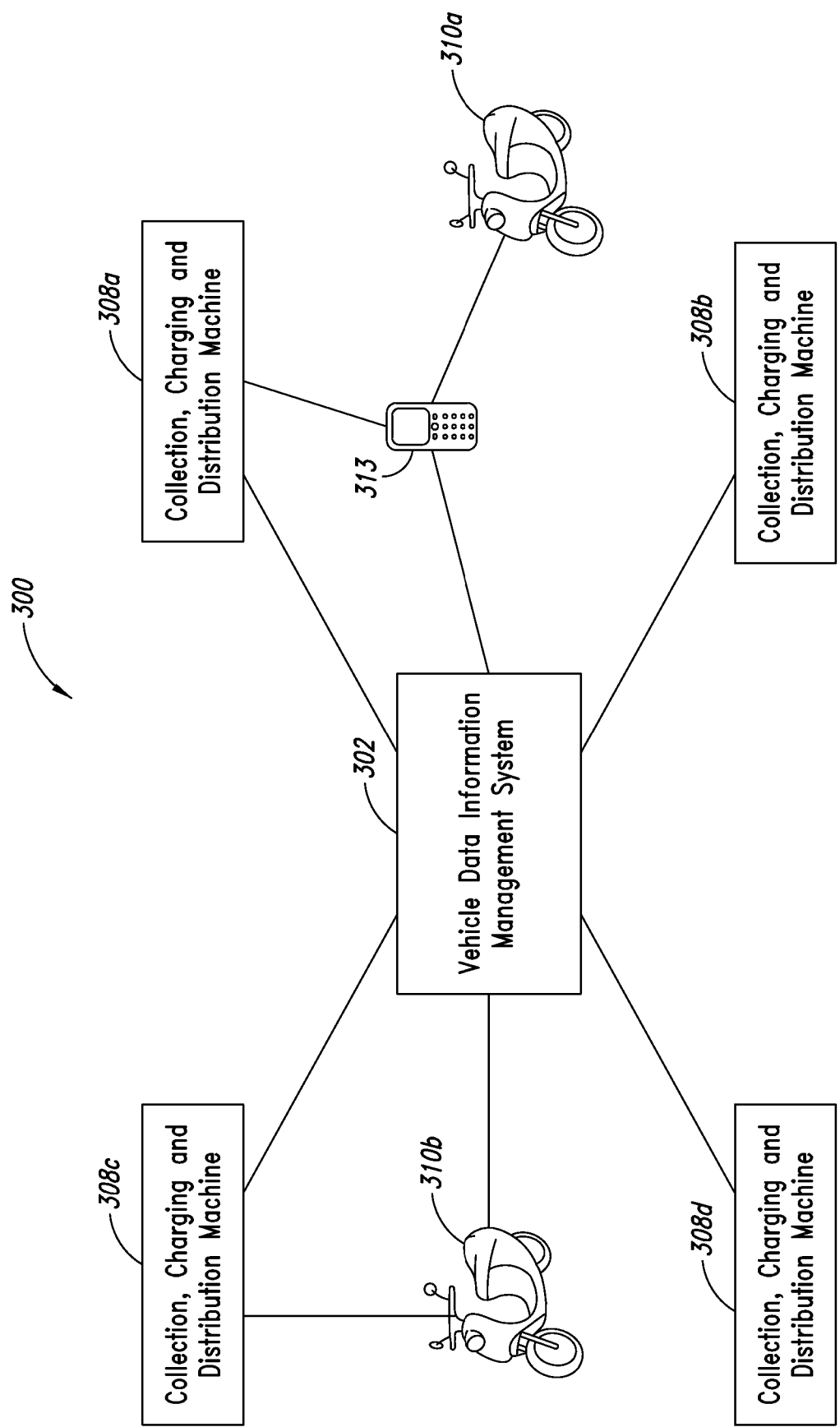
FIG. 3 is a block diagram of a system for providing information regarding a vehicle via a mobile device which shows collection, charging and distribution machines, such as that of FIG. 1, within the system, according to one non-limiting illustrated embodiment.

FIG. 3 is a block diagram of a system 300 for providing information regarding a vehicle via a mobile device 313 which shows example collection, charging and distribution machines 308a, 308b, 308c and 308d, such as collection, charging and distribution machine 102 of FIG. 1, within the system, according to one non-limiting illustrated embodiment.

Shown is a vehicle data information management system 302 for providing information regarding a vehicle via a mobile device, such as, for example, mobile device 313. For example, the vehicle data information management system 302 may provide information regarding diagnostics or status of the vehicle 310a; regarding subcomponents or subsystems of vehicle 310a; regarding a user or a user account; regarding selection or preferences associated with a user, a user account and/or a profile of a user; regarding usage history of the vehicle 310a or another vehicle, number of vehicles owned by the user, etc. This information may be received from one or any combination of the items shown in FIG. 3, including the example collection, charging and distribution machines 308a, 308b, 308c and 308d, the mobile device 313 itself, the vehicle data information management system 302, and/or the vehicle (e.g., electric scooter 310a or 310b). This may include information received from a memory module attached to the portable electrical energy storage device of the electric scooter 310a or 310b. This also may include information received from a memory module attached to or associated with the vehicle 310a or 310b, (e.g., a memory module of a subsystem or control system of vehicle 310a or 310b that stores or is configured to store diagnostic, status, settings, control information, historical driving habits or routes regarding the vehicle or other vehicles associated with a user, an account and/or a profile of a user, etc.). For example, this may include information received from or stored in any memory module storing or configured to store at least some information regarding one or more of: status or condition of a vehicle, status or condition of one or more systems of the vehicle, number of vehicles owned by a user, customizable features of the vehicle, settings of customizable features of the vehicle, condition or status of an engine or motor of the vehicle, one or more electrical systems of the vehicle, health of the vehicle, security of the vehicle, locks of the vehicle, transmission system of the vehicle, maintenance of the vehicle, recommended maintenance of the vehicle, scheduled maintenance of the vehicle, brake pad condition of the vehicle, status of one or more vehicle lights, engine temperature of the vehicle, mileage of the vehicle, one or more wheels of the vehicle, one or more tires of the vehicle, tire wear of one or more tires of the vehicle, tire pressure of one or more tires of the vehicle, speed of the vehicle, statistics regarding different speeds of the vehicle over time, one or more fluid levels of the vehicle, condition or status of an electrical energy storage device of the vehicle, a dashboard of the vehicle, a dashboard display of the vehicle, a current state of a dashboard display of the vehicle, configurable settings of a customizable dashboard display of the vehicle, information stored on a computer readable medium coupled to a portable electrical energy storage device of the vehicle, configurable vehicle lighting, configurable vehicle lighting status, configurable vehicle lighting settings, current odometer reading of the vehicle, historical usage statistics of the vehicle, historical usage statistics regarding an electrical energy storage device of the vehicle, historical usage statistics regarding a motor of the vehicle, historical usage statistics regarding efficiency of the vehicle, geographic travel statistics of the vehicle, a current location of the vehicle, previous locations of the vehicle, target efficiency of the vehicle, recommended settings of the vehicle, user account settings of a user associated with the vehicle, portable electrical energy storage devices for the vehicle, available portable electrical energy storage devices for the vehicle, locations of one or more available portable electrical energy storage devices for the vehicle, one or more collection, charging and distribution machines for portable electrical energy storage devices for the vehicle, portable electrical energy storage device exchange history at one or more collection, charging and distribution machines for portable electrical energy storage devices for the vehicle, and locations of one or more collection, charging and distribution machines for portable electrical energy storage devices for the vehicle, etc.

This information above may be received directly or indirectly from such a memory module described above. For example, this information may be received by a memory module attached to the portable electrical energy storage device of the electric scooter 310a from one or more systems of vehicle 310a and/or other memory module as described above (including, but not limited to: such a memory module of the user mobile device 313; of one or more collection, charging and distribution machines 308a-308d, of the vehicle data information management system 302, of another vehicle 310b, etc.). This information may also be received indirectly from the memory module via any one of the communication systems of the items in the system 300 shown in FIG. 3. For example, the data regarding the vehicle 310a described herein may be communicated to, stored in and communicated from the memory module, or the like, in the diagnostic data storage system attached to the portable electrical energy storage device of vehicle 310a as described in U.S. Provisional Patent Application Ser. No. 61/601,404 entitled "APPARATUS, METHOD AND ARTICLE FOR PROVIDING VEHICLE DIAGNOSTIC DATA" and filed on Feb. 21, 2012, and/or described in U.S. patent application Ser. No. 13/559,390, published as U.S. Patent Application Publication No. 20130031318, also entitled "APPARATUS, METHOD AND ARTICLE FOR PROVIDING VEHICLE DIAGNOSTIC DATA" and filed on Jul. 26, 2012, both of which are hereby incorporated by reference in their entireties. In some embodiments, the vehicle data information management system 302, or parts or subcomponents thereof, may be the back end or back office system 120 shown in FIG. 1. In other embodiments, the vehicle data information management system 302 may be part of or may be in operable communication with, the back end or back office system 120 shown in FIG. 1.

The information regarding a vehicle provided by the system 300 via a user mobile device may include, or may be based on, at least some information regarding one or more of: status or condition of the vehicle, status or condition of one or more systems of the vehicle, a number of vehicles owned by a user, customizable features of the vehicle, settings of customizable features of the vehicle, condition or status of an engine or motor of the vehicle, one or more electrical systems of the vehicle, health of the vehicle, security of the vehicle, locks of the vehicle, transmission system of the vehicle, maintenance of the vehicle, recommended maintenance of the vehicle, scheduled maintenance of the vehicle, brake pad condition of the vehicle, status of one or more vehicle lights, engine temperature of the vehicle, mileage of the vehicle, one or more wheels of the vehicle, one or more tires of the vehicle, tire wear of one or more tires of the vehicle, tire pressure of one or more tires of the vehicle, speed of the vehicle, statistics regarding different speeds of the vehicle over time, one or more fluid levels of the vehicle (e.g., oil level of the vehicle), condition or status of an electrical energy storage device of the vehicle, a dashboard of the vehicle, a dashboard display of the vehicle, a current state of a dashboard display of the vehicle, configurable settings of a customizable dashboard display of the vehicle, information stored on a computer readable medium coupled to a portable electrical energy storage device of the vehicle, configurable vehicle lighting, configurable vehicle lighting status, configurable vehicle lighting settings, current odometer reading of the vehicle, historical usage statistics of the vehicle, historical usage statistics regarding an electrical energy storage device of the vehicle, historical usage statistics regarding a motor of the vehicle, historical usage statistics regarding efficiency of the vehicle, geographic travel statistics of the vehicle, a current location of the vehicle, previous locations of the vehicle, target efficiency of the vehicle, recommended settings of the vehicle, user account settings of a user associated with the vehicle, portable electrical energy storage devices for the vehicle, available portable electrical energy storage devices for the vehicle, locations of one or more available portable electrical energy storage devices for the vehicle, one or more collection, charging and distribution machines for portable electrical energy storage devices for the vehicle, portable electrical energy storage device exchange history at one or more collection, charging and distribution machines for portable electrical energy storage devices for the vehicle, and locations of one or more collection, charging and distribution machines for portable electrical energy storage devices for the vehicle.

For example, information regarding usage history of the vehicle 310a may include, but is not limited to, the current location of the vehicle 310a and/or mobile device 313, the roads and driving routes previously taken to particular collection, charging and distribution machines a particular distance from the current location of the vehicle 310a and/or mobile device 313, preferred routes of the user, historical driving routes of the user, the current direction the user is traveling, and historical driving routes of the user determined based on portable electrical energy storage device exchanges which occurred at various collection, charging and distribution machines (e.g., collection, charging and distribution machines 308a, 308b, 308c and 308d), etc.

The vehicle data information management system 302 is in operable communication with the collection, charging and distribution machines 308a, 308b, 308c and 308d, and one or more user mobile communication devices 313 (only one shown as an example), such that data may be exchanged between the vehicle data information management system 302, the collection, charging and distribution machines 308a, 308b, 308c and 308d, and the user mobile communication device 313. In some embodiments, such exchange of data may be accomplished via storage of such data on a memory module attached to a portable electrical energy storage device used by the vehicle which is exchanged at one or more of collection, charging and distribution machines 308a, 308b, 308c and 308d. Also, the vehicle data information management system 302, the collection, charging and distribution machines 308a, 308b, 308c and 308d, and the user mobile communication device 313 may, in some embodiments, additionally or instead be in operable communication directly with each other.

This communication between the various items, systems and entities of FIG. 3 is enabled by the various communications subsystems of these various items, systems and entities. For example, this communication may be enabled by the various communications subsystems of the distribution machines 308a, 308b, 308c and 308d, the vehicle data information management system 302, the vehicles 310a and 310b, and the user mobile communications device 313. One or more of such communication subsystems may provide wired and/or wireless communications (e.g., cellular, local area network connections, and/or short range wireless connections using or being compatible with any operable communications protocol and/or standard). The communications subsystems of the items in FIG. 3 may include one or more ports, wireless receivers, wireless transmitters or wireless transceivers to provide wireless signal paths to the various remote components or systems. The remote communications subsystems may include one or more bridges or routers suitable to handle network traffic including switched packet type communications protocols (TCP/IP), Ethernet or other networking protocols.

For example, the vehicle data information management system 302 may receive an update from collection, charging and distribution machine 308c regarding diagnostics or status of the vehicle and/or usage history of the vehicle. In some embodiments, the vehicle data information management system 302 may continually or periodically monitor the collection, charging and distribution machines or other items shown in FIG. 3 to obtain such information. Also, the collection, charging and distribution machines may continually or periodically provide updates to the vehicle data information management system 302 regarding the vehicle information. This information may be provided to mobile device 313, vehicle 310a, and/or vehicle 310b continuously, periodically, aperiodically and/or in response to a request for such information from mobile device 313, vehicle 310a, and/or vehicle 310b. For example, vehicle information regarding vehicle 310a may be provided to mobile device 313, vehicle 310a, and/or vehicle 310b in response to the mobile device 313 or vehicle 310a or 310b being detected by the vehicle data information management system 302, or by collection, charging and distribution machine 308a, as being within close proximity to collection, charging and distribution machine 308a.

An alert may be sent to the mobile device 313 or vehicle 310a (e.g., via a text message, email, instant message, status update on a social media network, automated phone call, as a notification within a specific application, etc.) regarding diagnostics or status of the vehicle (e.g., portable electrical energy storage device charge level, maintenance warnings, offers, promotions) etc., based on the vehicle information. This alert may be sent via any variety of communications channels including, but not limited to, cellular telephone networks, computer wireless fidelity (Wi-Fi) networks, satellite networks, short range wireless signals, etc., or any operable combination thereof.

The alert may also include a selectable link, icon or other user interface element that the user may select to reserve an available portable electrical energy storage device associated with the alert or select to receive further information regarding resolving a maintenance issue or otherwise act on the information communicated in the alert. For example, once the element that the user may select to reserve an available portable electrical energy storage device is selected, information representing the reservation is communicated to the vehicle data information management system 302 and/or the respective collection, charging and distribution machine at which the portable electrical energy storage device is available. This reservation information is stored in a database of reservations maintained centrally by the vehicle data information management system 302 and/or locally at the selected collection, charging and distribution machine.

Any item of FIG. 3 may identify, authenticate, verify or otherwise facilitate such operations via the user interface of the vehicle, the mobile device, and/or or collection, charging and distribution machine by the user inputting particular user credentials, a password, biometric data, a user identification number or code, and/or by the card reader 208e described above, etc. Also, any item of FIG. 3 may additionally or alternatively identify, authenticate, verify or otherwise facilitate such operations via information received from a user security token (not shown), mobile device 313 or other item associated with the user. The information regarding the vehicle may be communicated and organized in any manner including in a list, as a group of selectable icons, etc., that indicates information based on the vehicle data.

In some instances, particular collection, charging and distribution machines may be further away from the user's current location than other collection, charging and distribution machines near the user that perhaps are currently experiencing higher demand. Thus, the vehicle data information management system 302 may communicate to a mobile device of the user a redeemable incentive (e.g., a discounted fee, free device exchanges, etc.) for the user to exchange or return their portable electrical energy storage devices to one of the collection, charging and distribution machines that are further away from the user than other closer collection, charging and distribution machines that also have available portable electrical energy storage devices. For example, the incentive may be redeemable as a discount or credit on fees related to the use of one or more of the plurality of collection, charging and distribution machines, a discounted fee, free device exchanges, etc. Also, users may be provided similar incentives to return or exchange electrical energy storage devices before they are depleted or almost depleted to head off or smooth out an anticipated spike in demand.

In some embodiments, various options and features regarding changing settings or configurations of the vehicle may be communicated to or from the mobile device to accomplish changes in the configurations or settings. For example, such changes may be selected by the user on the mobile device 313 and then communicated to the vehicle through one or more of the various channels and networks described herein.

In some embodiments, various options and features regarding available portable electrical energy storage devices may be generated and made available to the user. For example, a user's historical route information may be utilized by the vehicle data information management system 302 to anticipate vehicle maintenance issues, anticipate which collection, charging and distribution machines the user may likely to want to visit, etc. Information regarding resolving the anticipated vehicle maintenance issues and/or availability of charged portable electrical energy storage devices at these particular collection, charging and distribution machines may be communicated to the user automatically as the maintenance issues arise and/or as these portable electrical energy storage devices at these locations become available (e.g., by generating an alert and/or sending an alert to the user).

Figure 4:
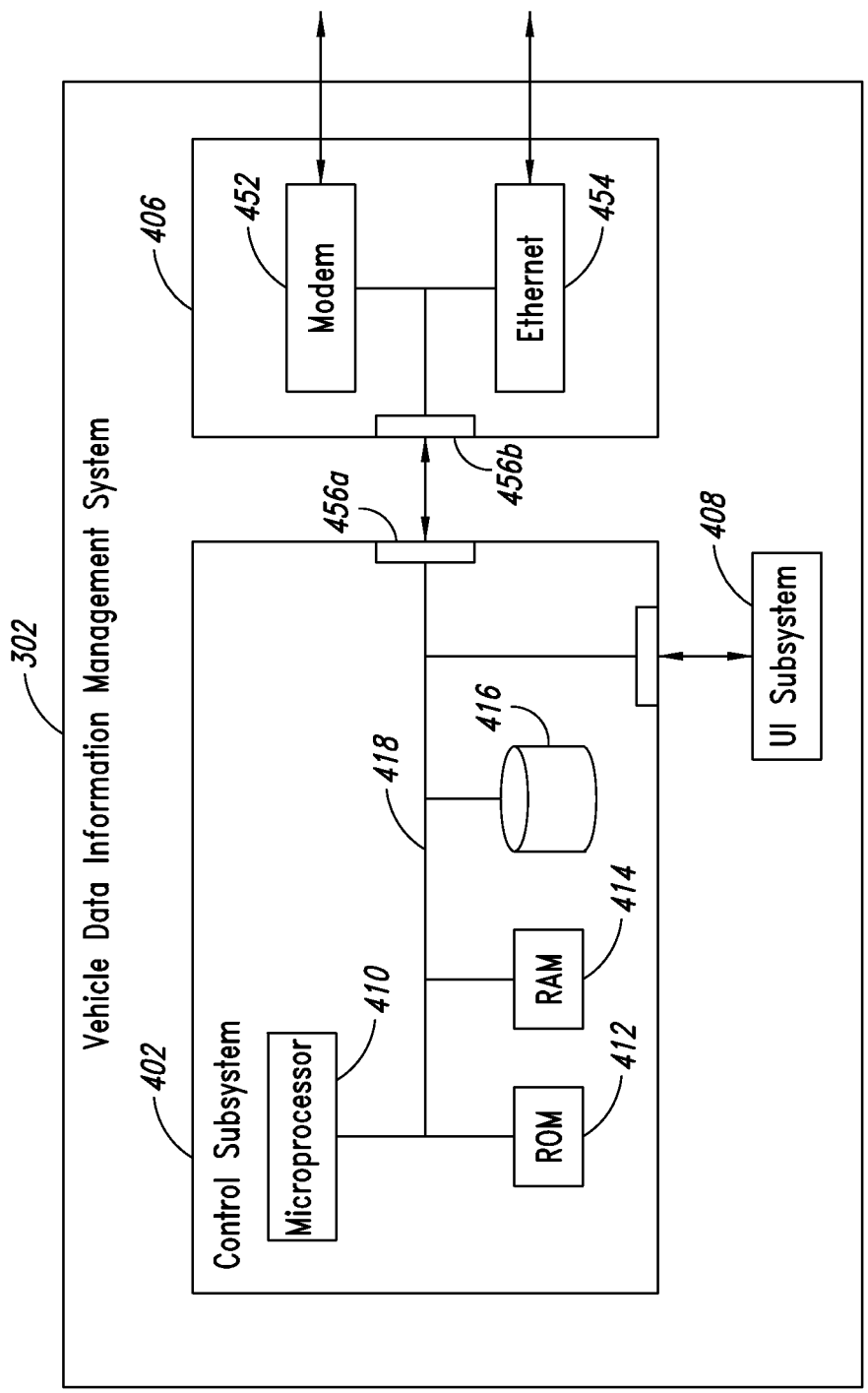
FIG. 4 is a schematic view of the vehicle data information management system of FIG. 3, according to one non-limiting illustrated embodiment.

FIG. 4 is a schematic view of the vehicle data information management system of FIG. 3, according to one non-limiting illustrated embodiment.

The vehicle data information management system 302 includes a control subsystem 402, a communications subsystem 406, and a user interface subsystem 408. However, such a system and associated functionalities, or operable sub-components thereof, may also be present in the vehicle (e.g., vehicle 310a of FIG. 3), the memory module attached to the portable electrical energy storage device, and/or the user mobile device 313 also shown in FIG. 3.

The control subsystem 402 includes a controller 410, for example a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 410 may take the form of a microprocessor (e.g., INTEL, AMD, ATOM). The control subsystem 402 may also include one or more non-transitory processor- or computer-readable storage media, for example read only memory (ROM) 412, random access memory (RAM) 414, and data store 416 (e.g., solid-state storage media such as flash memory or EEPROM, spinning storage media such as hard disk). The non-transitory processor- or computer-readable storage media 412, 414, 416 may be in addition to any non-transitory storage medium (e.g., registers) which is part of the controller 410. The control subsystem 402 may include one or more buses 418 (only one illustrated) coupling various components together, for example one or more power buses, instruction buses, data buses, etc.

Figure 6:
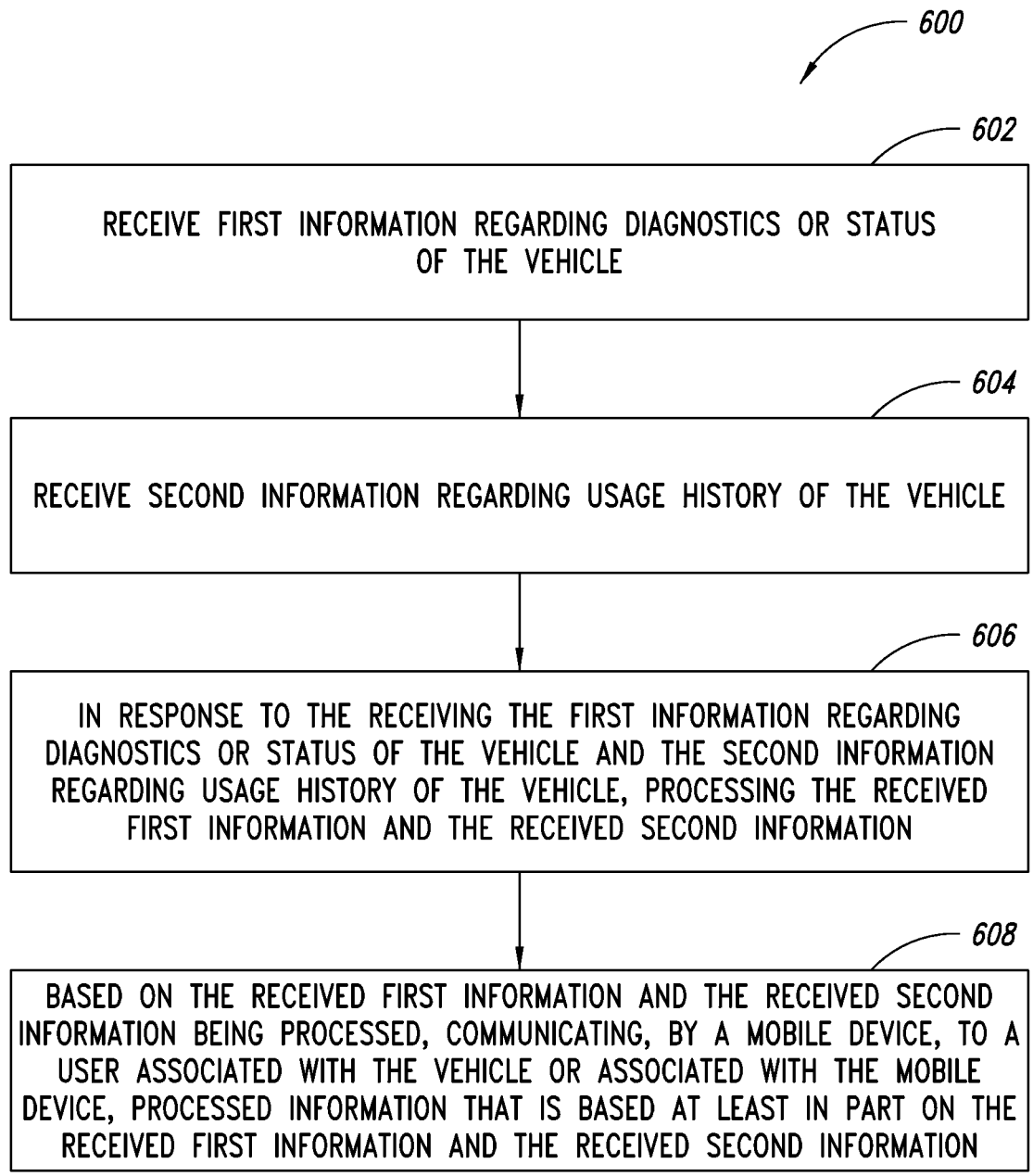
FIG. 6 is a flow diagram showing a method of providing information regarding a vehicle via a user mobile device, according to one non-limiting illustrated embodiment.
Figure 7:
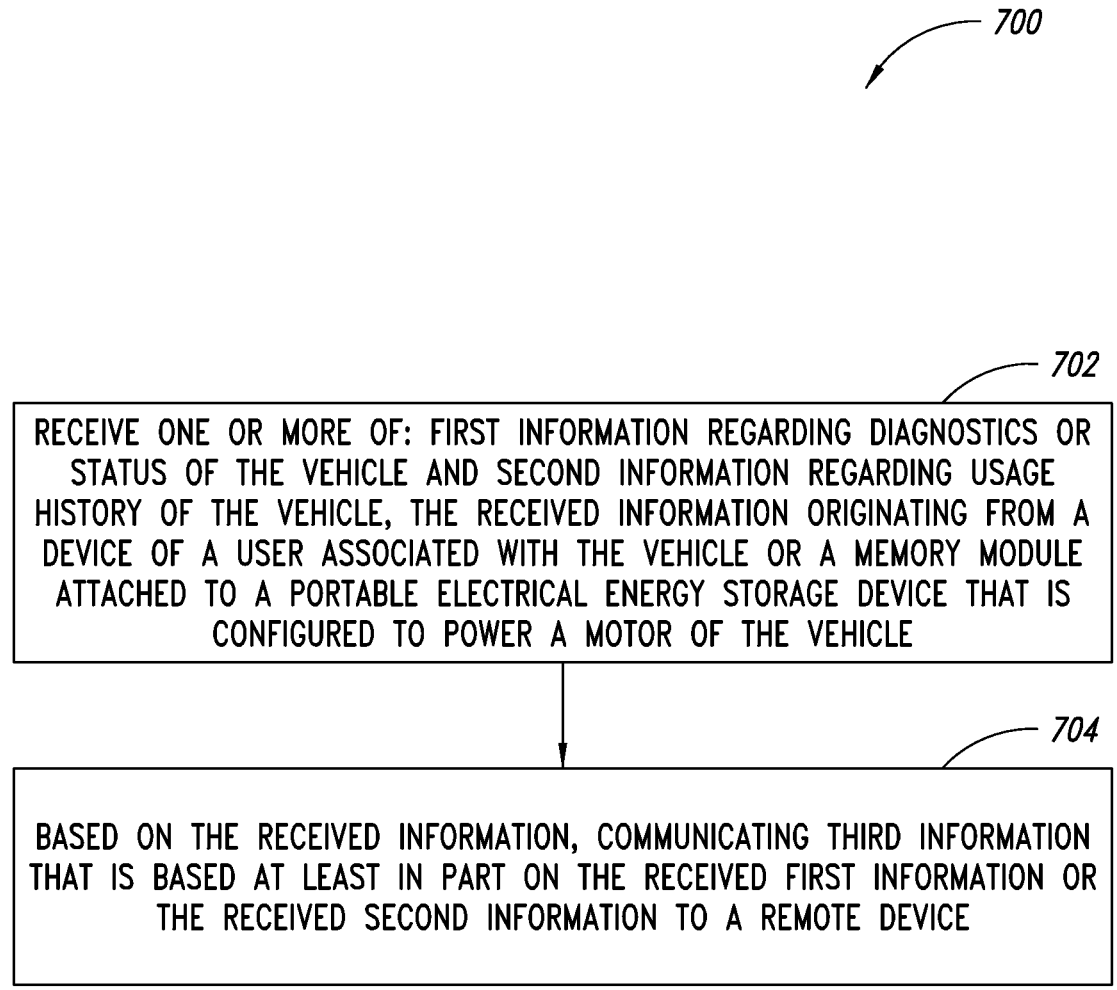
FIG. 7 is a flow diagram showing a method of providing information regarding a vehicle from a perspective of the vehicle data information management system of FIG. 3 and FIG. 4, according to one non-limiting illustrated embodiment.
Figure 8:
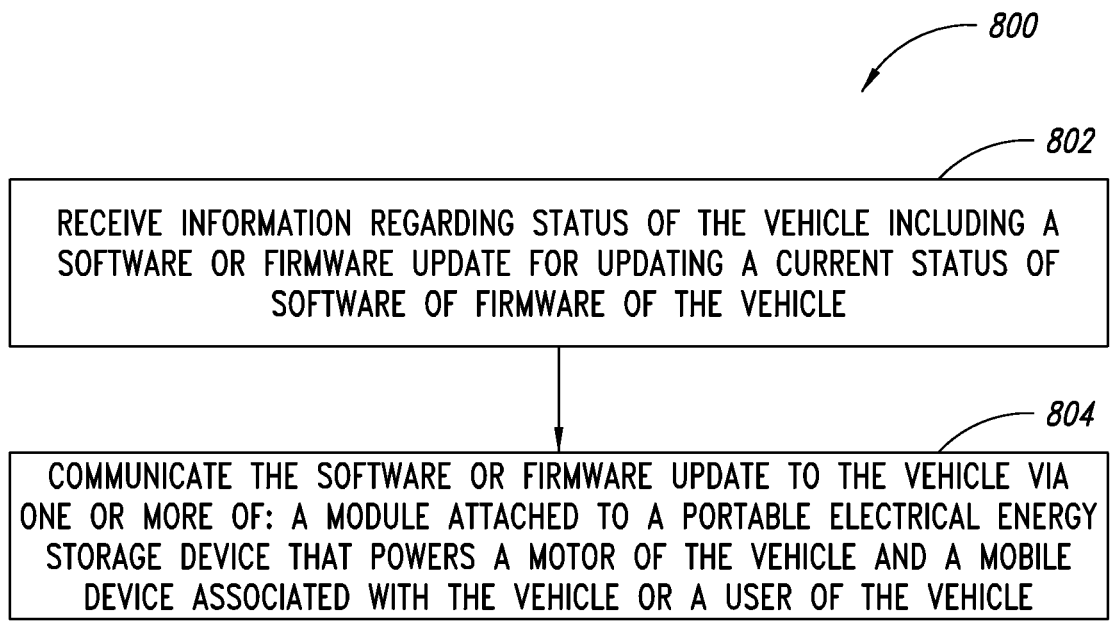
FIG. 8 is a flow diagram showing method of providing information regarding a vehicle involving a software or firmware update for updating a current status of software or firmware of the vehicle, according to one non-limiting illustrated embodiment.

As illustrated, the ROM 412, or some other one of the non-transitory processor- or computer-readable storage media 412, 414, 416, stores instructions and/or data or values for variables or parameters. The sets of data may take a variety of forms, for example a lookup table, a set of records in a database, etc. The instructions and sets of data or values are executable by the controller 410. Execution of the instructions and sets of data or values causes the controller 410 to perform specific acts to cause the vehicle data information management system 302 to receive, send and/or to provide information regarding a vehicle to various external devices (e.g., such as those items, or devices associated with those items shown in FIG. 4). Execution of the instructions and sets of data or values may also cause the controller 410 to perform specific acts to cause the vehicle data information management system 302 receive, send, store, maintain, update and otherwise manage information regarding a vehicle. Specific operation of the vehicle data information management system 302 is described herein and also below with reference to various flow diagrams (FIGS. 6-8).

The controller 410 may use RAM 414 in a conventional fashion, for volatile storage of instructions, data, etc. The controller 410 may use data store 416 to log or retain information, for example, information regarding one or more of: status or condition of the vehicle, status or condition of one or more systems of the vehicle, a number of vehicles owned by a user, customizable features of the vehicle, settings of customizable features of the vehicle, condition or status of an engine or motor of the vehicle, one or more electrical systems of the vehicle, health of the vehicle, security of the vehicle, locks of the vehicle, transmission system of the vehicle, maintenance of the vehicle, recommended maintenance of the vehicle, scheduled maintenance of the vehicle, brake pad condition of the vehicle, status of one or more vehicle lights, engine temperature of the vehicle, mileage of the vehicle, one or more wheels of the vehicle, one or more tires of the vehicle, tire wear of one or more tires of the vehicle, tire pressure of one or more tires of the vehicle, speed of the vehicle, statistics regarding different speeds of the vehicle over time, one or more fluid levels of the vehicle (such as oil level), condition or status of an electrical energy storage device of the vehicle, a dashboard of the vehicle, a dashboard display of the vehicle, a current state of a dashboard display of the vehicle, configurable settings of a customizable dashboard display of the vehicle, information stored on a computer readable medium coupled to a portable electrical energy storage device of the vehicle, configurable vehicle lighting, configurable vehicle lighting status, configurable vehicle lighting settings, current odometer reading of the vehicle, historical usage statistics of the vehicle, historical usage statistics regarding a portable electrical energy storage device of the vehicle, historical usage statistics regarding a motor of the vehicle, historical usage statistics regarding efficiency of the vehicle, geographic travel statistics of the vehicle, a current location of the vehicle, previous locations of the vehicle, target efficiency of the vehicle, recommended settings of the vehicle, user account settings of a user associated with the vehicle, portable electrical energy storage devices for the vehicle, available portable electrical energy storage devices for the vehicle, locations of one or more available portable electrical energy storage devices for the vehicle, one or more collection, charging and distribution machines for portable electrical energy storage devices for the vehicle, portable electrical energy storage device exchange history at one or more collection, charging and distribution machines for portable electrical energy storage devices for the vehicle, and locations of one or more collection, charging and distribution machines for portable electrical energy storage devices for the vehicle.

The control subsystem 402 may also receive signals from various sensors and/or components of a collection, charging and distribution machine, such as the collection, charging and distribution machine 102 of FIG. 1 via the communications subsystem 206 of collection, charging and distribution machine 102. This information may include information that characterizes or is indicative of operation, status, or condition of such components. Sensors are represented in FIG. 2 by the letter S appearing in a circle along with appropriate subscript letters. For example, one or more position sensors $S_{P1}$-$S_{PN}$ may detect the presence or absence of portable electrical power storage device 106 at each of the receivers 104. This information may be communicated to the control subsystem 402. Also, one or more charge sensors $S_{C1}$-$S_{CN}$ may detect a charge level of the portable electrical power storage devices 106 at each of the receivers 104. This information may also be communicated to the control subsystem 402.

The communications subsystem 406 may include one or more communications modules or components which facilities communications with the various components of a collection, charging and distribution machine, such as collection, charging and distribution machine 102 of FIG. 1 and also the various components of the collection, charging and distribution machines 308a, 308b, 308c and 308d of FIG. 3, the portable electrical energy storage device transfer service 312 and the one or more user mobile communication devices 313, such that data may be exchanged between the vehicle data information management system 302, the collection, charging and distribution machines 308a, 308b, 308c and 308d, and the user mobile communication device 313. The communications subsystem 406 may, for example, include one or more modems 452 or one or more Ethernet or other types of communications cards or components 454. A port 456a of the control subsystem 402 may communicatively couple the control subsystem 402 with a port 456b of the communications subsystem 406. The communications subsystem 406 may provide wired and/or wireless communications. The communications subsystem 406 may include one or more ports, wireless receivers, wireless transmitters or wireless transceivers to provide wireless signal paths to the various remote components or systems employing or making use of any operable wired and wireless communications standard or protocol. The remote communications subsystem 406 may include one or more bridges or routers suitable to handle network traffic including switched packet type communications protocols (TCP/IP), Ethernet or other networking protocols.

Figure 5A:
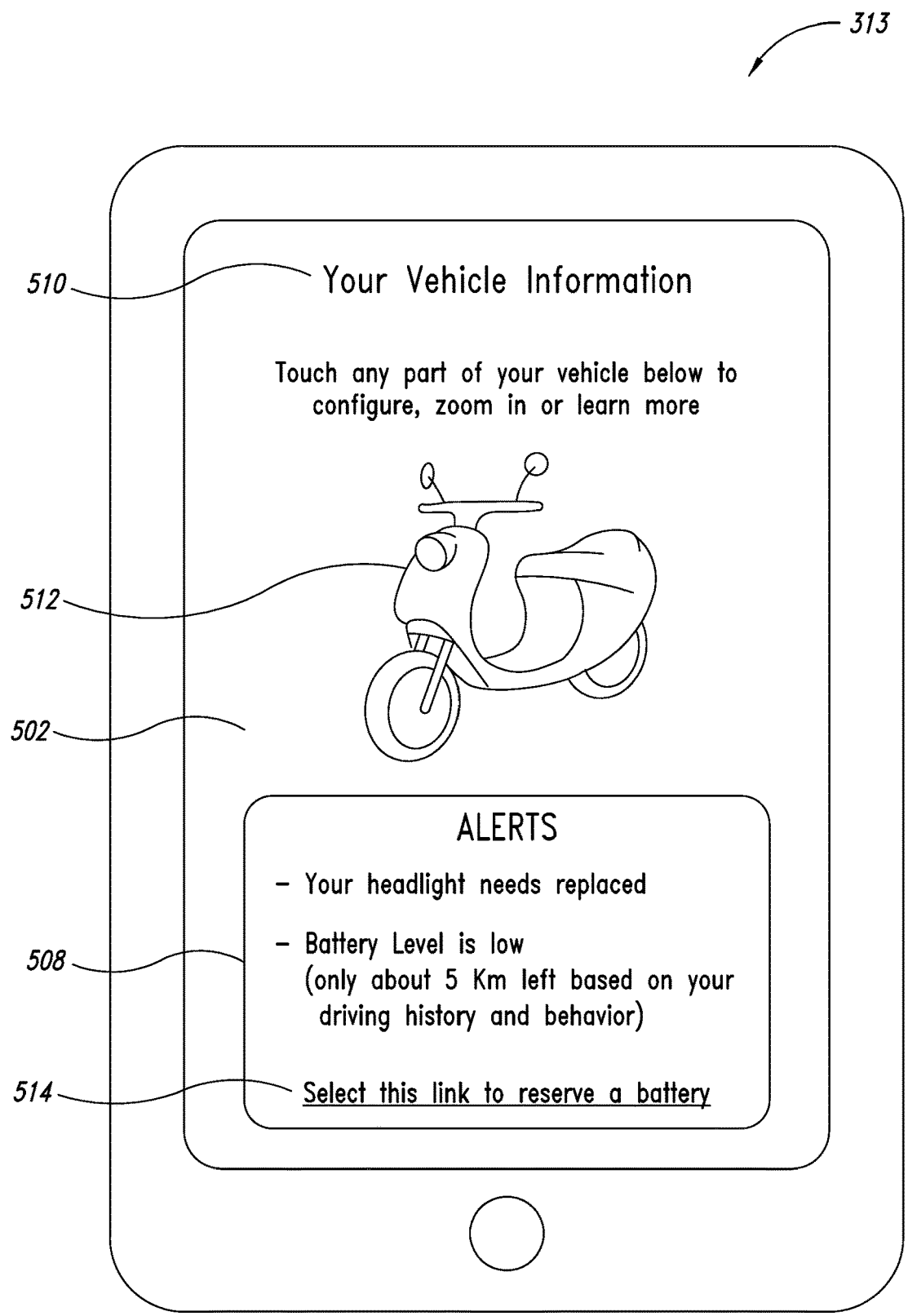
FIG. 5A is an example user interface of a user mobile device presenting information regarding diagnostics or status of the vehicle based on information regarding usage history of the vehicle, according to one non-limiting illustrated embodiment.

The user interface system 408 includes one or more user input/output (I/O) components (not illustrated). For example, user interface system 408 may include a touch screen display operable to present information and a graphical user interface (GUI) to a user and to receive indications of user selections. The user interface system 408 may include a keyboard or keypad, and/or a cursor controller (e.g., mouse, trackball, trackpad, and/or touch screen) to allow a user to enter information and/or select user selectable icons in a GUI. FIG. 5A is an example user interface 502 of a user mobile device 313 presenting information regarding diagnostics or status of the example vehicle 310a based on information regarding usage history of the vehicle, according to one non-limiting illustrated embodiment. Also, the user interface 502 may additionally or instead be a user interface of the vehicle 310a or of a collection, charging and distribution machine shown in FIG. 3.

In one example embodiment, shown under a header entitled "Your Vehicle Information" 510 is an example image or drawing 512 of the vehicle 310a. The image or drawing 512 of the vehicle 310a includes parts that are selectable user interface elements which, when selected, cause the mobile device 313 to display further information regarding the area of the vehicle selected on the image or drawing 512 of the vehicle 310*a*. For example, in one embodiment, when the user touches the portion of the touch screen of the mobile device 313 showing the headlight in the image or drawing 512 of the vehicle 310*a*, information is presented via the mobile device 313 regarding the current status of the headlight (e.g., hours left until the lamp needs replaced) and/or electrical systems associated with the headlight. Such information may be wirelessly received by the mobile device directly from the applicable systems of the vehicle 310*a*, from a memory module attached to a portable electrical energy storage device in the vehicle 310*a*, from the vehicle data information management system, from a collection, charging and distribution machine, etc., or via a communication path which includes one or more of these items.

The presentation of the information regarding diagnostics or status of the example vehicle 310*a* based on information regarding usage history of the vehicle may be dependent on authentication or verification of the user. Such authentication may be performed in a variety of manners as further disclosed herein. For example, the user may log on to a password protected account via the mobile device 313. The account may be associated with the user, the vehicle and/or the mobile device 313. Also, the mobile device 313 may itself store credentials or other authentication information which will automatically authenticate the user possibly in combination with one or more other user devices (e.g., key fob, security token, etc.) to a remote server and/or another external device (e.g., the vehicle, a collection, charging and distribution machine, the vehicle data information management system 302, etc.).

Also shown are one or more displayed alerts 508 generated or received by the mobile device 313. In the example, shown in FIG. 5A, in addition to the alert that the headlight of vehicle 310*a* needs replaced, an alert that the portable electrical energy storage device charge level is low for the portable electrical energy storage device in vehicle 310*a* is presented on the mobile device 313. This alert regarding the portable electrical energy storage device charge level being low may be generated based on received vehicle data regarding a current charge level of a portable electrical energy storage device of the vehicle 310*a* and vehicle information (possibly received from a different source) regarding usage history of the vehicle. The vehicle information regarding usage history of the vehicle may include data regarding driving behavior associated with the user and the alert may be generated based on an estimate of how far in terms of distance, or how long in terms of time, the current charge level of the portable electrical energy storage device will last based on the data regarding historical driving behavior associated with the user and the current charge level of the portable electrical energy storage device.

This information may be received, accumulated, formatted, culminated for presentation to a user, processed and/or presented by any on one or more of items shown in FIG. 3 (e.g., on the mobile device 313). A user interface element (e.g., link 514) may also be presented such that the user may select the user interface element to take further action or cause automated actions to occur based on the presented alerts 508. For example, the user may select the user interface element (e.g., link 514) or otherwise indicate that the user would like to reserve a portable electrical energy storage device based on the alert presented on the mobile device 313 that the charge level of the portable electrical energy storage device is low.

Figure 5B:
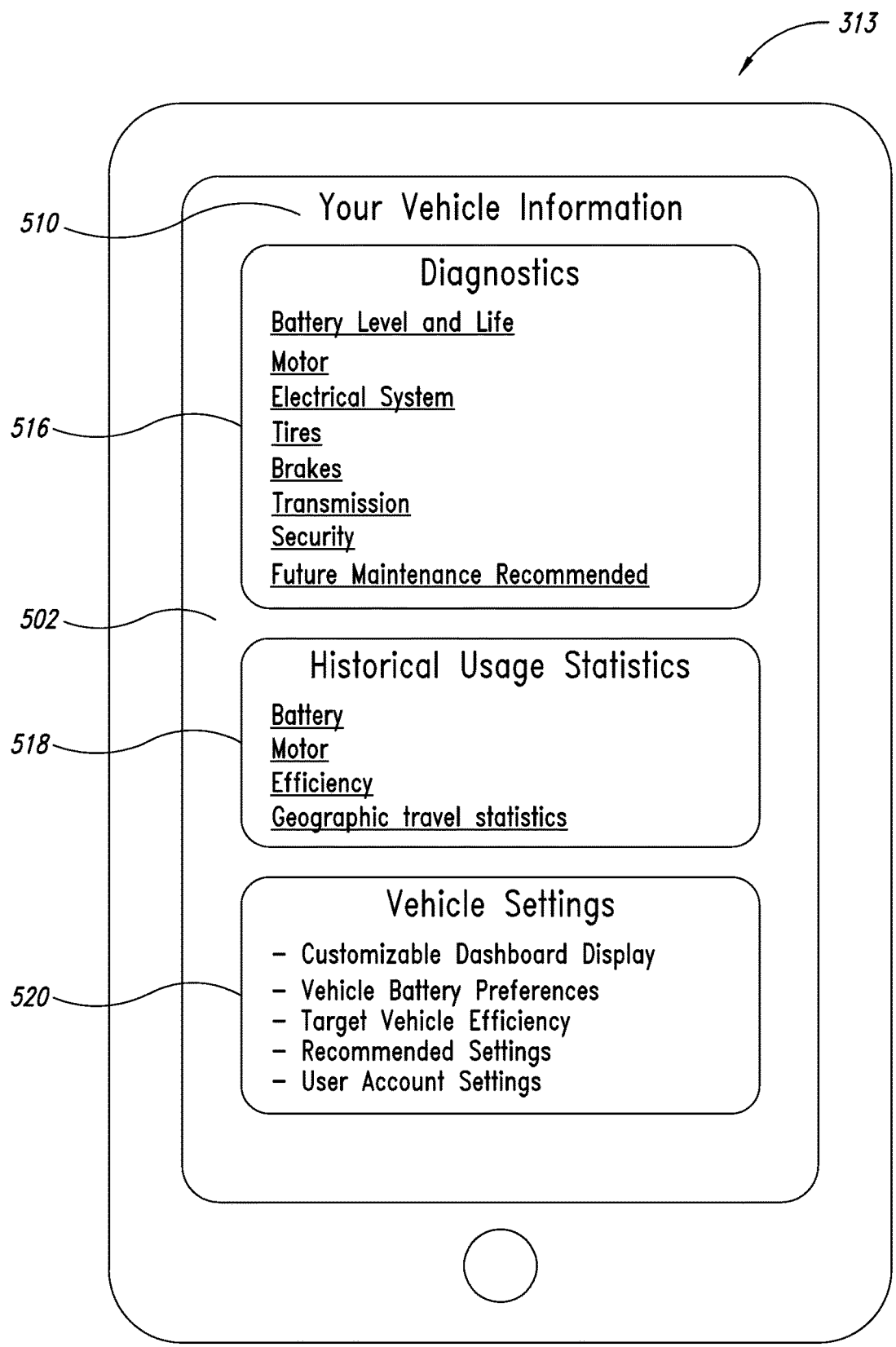
FIG. 5B is an example user interface of a user mobile device presenting information regarding diagnostics or status of the vehicle along with information regarding usage history of the vehicle, according to one non-limiting illustrated embodiment.

FIG. 5B is the example user interface 502 of the user mobile device 313 presenting information regarding diagnostics or status 516 of the vehicle 310*a* along with information regarding usage history 518 of the vehicle 310*a*, or user associated with the vehicle 310*a*, according to one non-limiting illustrated embodiment. Also, available vehicle settings 520 are displayed on the user interface 502. Each of the items listed within the applicable area on the user interface 502 may also be selectable by the user (e.g., links), which, once selected, may provide further information or take further actions regarding the item selected.

For example, if the user selects the "customizable dashboard display" link under vehicle settings 520, the mobile device may present a user menu enabling the user to select various dashboard display configurations. The mobile device (e.g., via an application running on the mobile device operating system) will then communicate the selected dashboard display configuration directly to the vehicle 310*a*, to a memory module attached to a portable electrical power storage device of the vehicle 310*a*, to the vehicle data information management system, and/or any other item shown in FIG. 3, to accomplish changing or setting the dashboard display of vehicle 310*a* to be the dashboard display selected via the user interface 502 of the mobile device 313. Examples of user mobile devices having operating systems for which the functionality described herein may be implemented via an application running on the operating system of the mobile device include, but are not limited to: iPhone® mobile devices, Samsung® mobile devices, Android® devices, Windows® mobile devices, Blackberry® mobile devices, other smartphone and/or tablet devices, etc. The user interface 502 may also display a confirmation that the particular action based on received vehicle data and the input provided by the user has been performed.

FIG. 6 is a flow diagram showing a method 600 of providing information regarding a vehicle via a user mobile device, according to one non-limiting illustrated embodiment.

At 602, the mobile device 313 receives first information regarding diagnostics or status of the vehicle.

At 604, the mobile device 313 receives second information regarding usage history of the vehicle.

At 606, the mobile device 313, in response to the receiving the first information regarding diagnostics or status of the vehicle and the second information regarding usage history of the vehicle, processes the received first information and the received second information.

At 608, the mobile device 313, based on the received first information and the received second information being processed, communicates to a user associated with the vehicle or associated with the mobile device, processed information that is based at least in part on the received first information and the received second information.

FIG. 7 is a flow diagram showing method 700 of providing information regarding a vehicle from a perspective of the vehicle data information management system of FIG. 3 and FIG. 4, according to one non-limiting illustrated embodiment.

At 702, the vehicle data information management system receives one or more of: first information regarding diagnostics or status of the vehicle and second information regarding usage history of the vehicle. The received information originates from a device of a user (e.g., mobile device 313) associated with the vehicle or a memory module attached to a portable electrical energy storage device that is configured to power a motor of the vehicle.

At 704, the vehicle data information management system, based on the received information, communicates third information that is based at least in part on the received first information or the received second information to a remote device.

FIG. 8 is a flow diagram showing method 800 of providing information regarding a vehicle involving a software or firmware update for updating a current status of software or firmware of the vehicle, according to one non-limiting illustrated embodiment.

At 802, the vehicle data information management system receives information regarding a status of a vehicle including a software or firmware update for updating a current status of software or firmware of the vehicle.

At 804, the vehicle data information management system communicates the software or firmware update to the vehicle via one or more of: a module attached to a portable electrical energy storage device that powers a motor of the vehicle and a mobile device associated with the vehicle or a user of the vehicle.

FIGS. 9-19 are additional examples of a user interface 502 of a user mobile device 313 presenting information regarding the vehicle, the user, the portable electrical power storage device exchange service, collection and distribution machine locations, the user account, set up of the vehicle and/or other information relevant to the user or the vehicle. Any component of or feature regarding these example user interfaces may be combined with those of the example user interfaces of FIGS. 5A and 5B and are non-limiting. Also, the user interface 502 may additionally or instead be a user interface of the vehicle 310a or of a collection and distribution machine (e.g., such as that shown in FIG. 3) or any presentation device or computing device the user may utilize.

Figure 9:
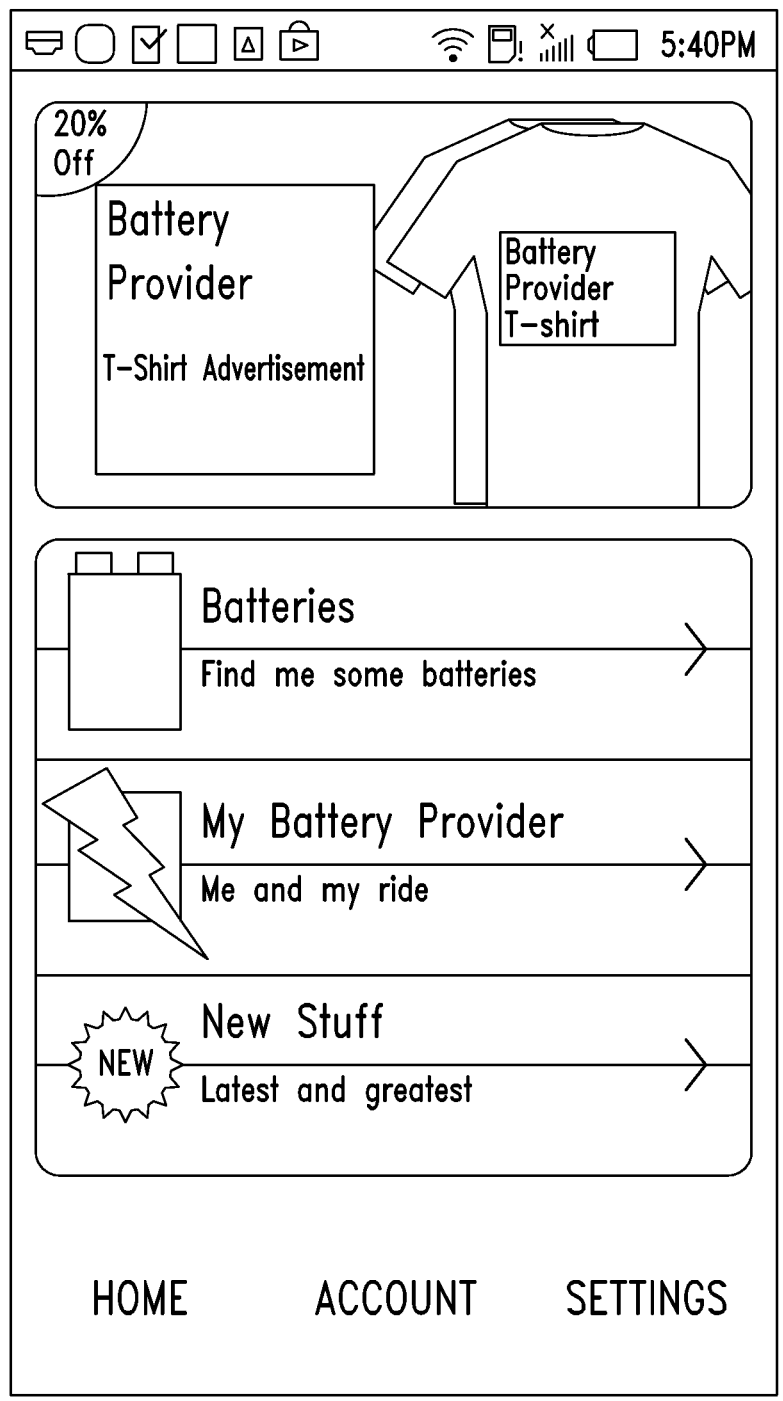
FIG. 9 is an example user interface of a user mobile device presenting an example initial menu providing menu choices regarding portable electrical power storage device locations; user account and vehicle information; and other useful information for a user, according to one non-limiting illustrated embodiment.

FIG. 9 is an example user interface of a user mobile device presenting an example initial menu providing menu choices regarding portable electrical power storage device locations; user account and vehicle information; and other useful information for a user, according to one non-limiting illustrated embodiment. The user menu may also provide advertisements related to the portable electrical power storage device exchange service or other third party advertisers or companies. These advertisements may be targeted to the user as described in U.S. Provisional Patent Application No. 61/773,614, filed Mar. 6, 2013 entitled "APPARATUS, METHOD AND ARTICLE FOR PROVIDING TARGETED ADVERTISING IN A RECHARGEABLE ELECTRICAL POWER STORAGE DEVICE DISTRIBUTION ENVIRONMENT", which is hereby incorporated by reference in its entirety. The "Batteries" selectable menu option, when selected, provides the user additional information regarding locations of portable electrical power storage devices and/or collection and distribution machines, including, in some embodiments, those near the current location of the user. The "My Battery Provider" selectable menu option, when selected, provides the user additional information regarding the portable electrical power storage device exchange service provider, the user's account with the portable electrical power storage device exchange service provider, diagnostics regarding the user's vehicle and/or configurable setup options and features of the vehicle. The "New Stuff" selectable menu option, when selected, provides the user additional information regarding other information which may be relevant or of interest to the user including, but not limited to information regarding: offers and promotions regarding the portable electrical power storage device exchange service; targeted advertising and/or targeted advertising information, for example, such as that as described in U.S. Provisional Patent Application No. 61/773,614, filed Mar. 6, 2013 entitled "APPARATUS, METHOD AND ARTICLE FOR PROVIDING TARGETED ADVERTISING IN A RECHARGEABLE ELECTRICAL POWER STORAGE DEVICE DISTRIBUTION ENVIRONMENT"; new products and/or services; updates and/or alerts regarding the vehicle and/or the regarding the portable electrical power storage device exchange service; news; social media; social media applications; social media accounts of the user; other user accounts; new available vehicles, etc. The "Account" selectable menu option, when selected, provides the user additional information regarding the user's account with the portable electrical power storage device exchange service and ability to modify a user profile and other settings. The "Settings" selectable menu option, when selected, provides the user additional information regarding settings of the application providing the menu interface and/or the user's account with the portable electrical power storage device exchange service and ability to modify a user profile and other settings.

Figure 10:
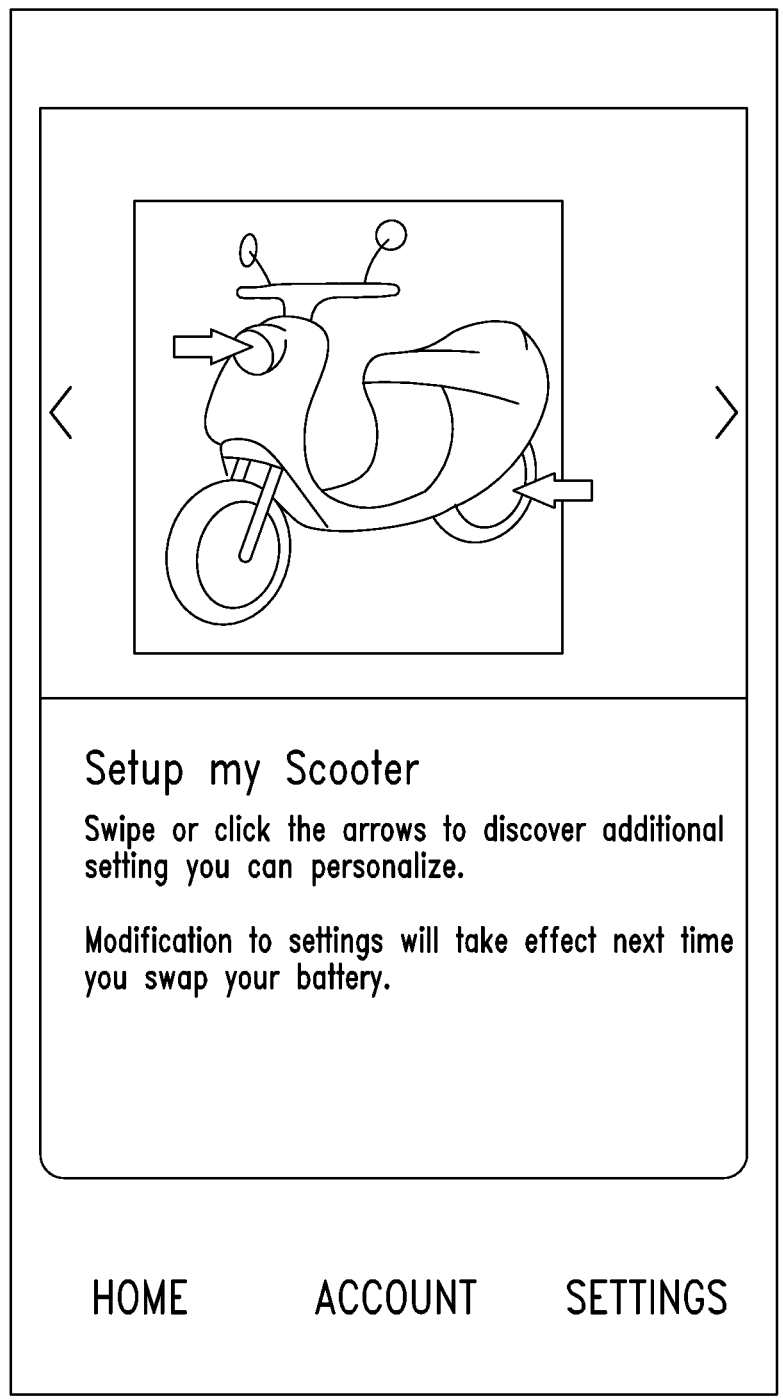
FIG. 10 is an example user interface of a user mobile device presenting an example user menu providing menu choices regarding vehicle setup options, according to one non-limiting illustrated embodiment.

FIG. 10 is an example user interface of a user mobile device presenting an example user menu providing menu choices regarding vehicle setup options, according to one non-limiting illustrated embodiment. For example, this user menu may appear directly, or indirectly through other menu selections, as a result of or in response to the user selecting the "My Battery Provider" and/or "Settings" selectable menu option shown in FIG. 9, and/or the "Setup" selectable menu option shown in FIG. 13. Shown is an interactive image of the user's vehicle, portions of which the user can select to modify settings regarding, or learn more regarding, the selected portion of the vehicle.

Figure 11:
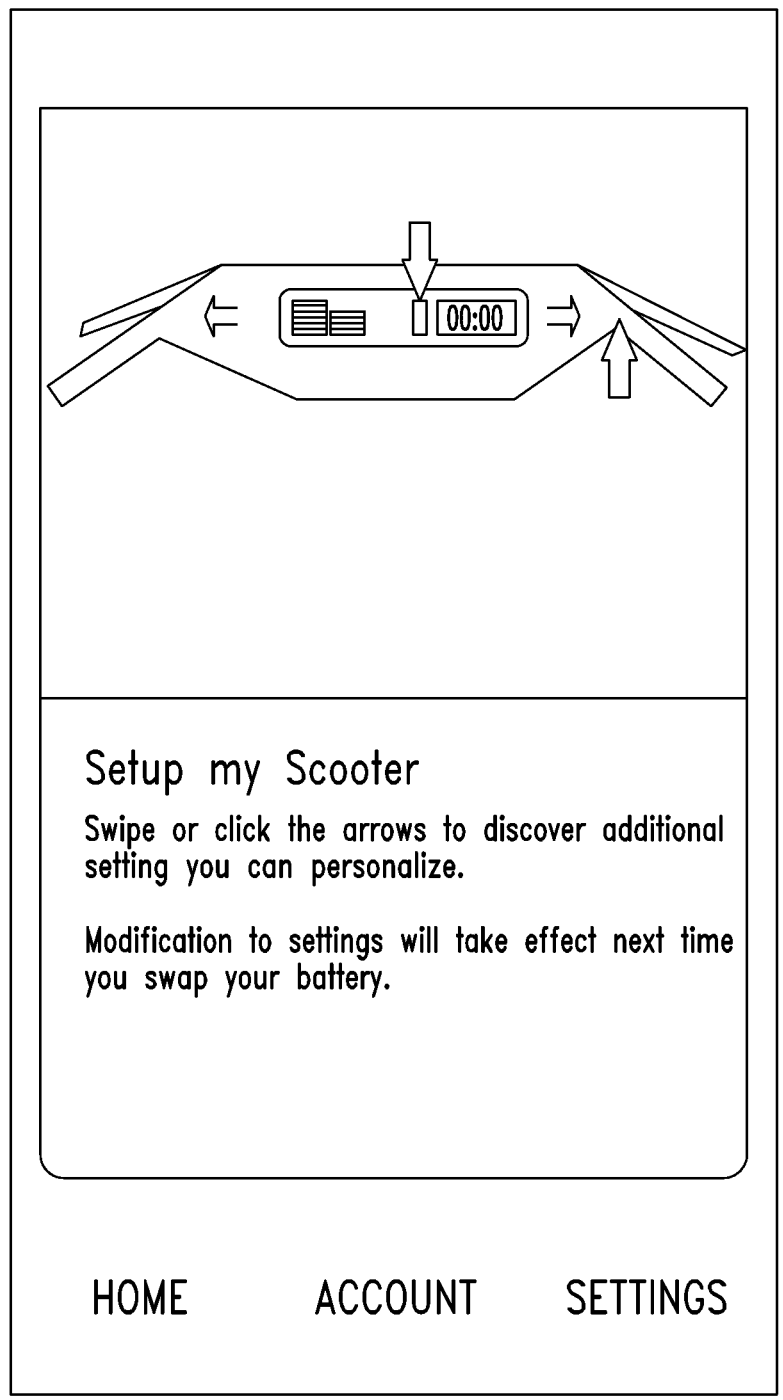
FIG. 11 is an example user interface of a user mobile device presenting an example user menu providing menu choices regarding further vehicle setup options for a selected portion of the vehicle, according to one non-limiting illustrated embodiment.

FIG. 11 is an example user interface of a user mobile device presenting an example user menu providing menu choices regarding further vehicle setup options for a selected portion of the vehicle, according to one non-limiting illustrated embodiment. These further options are regarding setting of the vehicle dashboard. For example, this user menu may appear directly, or indirectly through other menu selections, as a result of or in response to the user selecting the dashboard portion of the vehicle image shown in FIG. 10. Shown is an interactive image of the user's vehicle's dashboard, portions of which are indicated by arrows indicating that the user can select these portions to modify settings regarding, or learn more regarding, the selected portion of the dashboard. Similar corresponding menus will appear when the user selects different corresponding portions of the vehicle image shown in FIG. 10.

Figure 12:
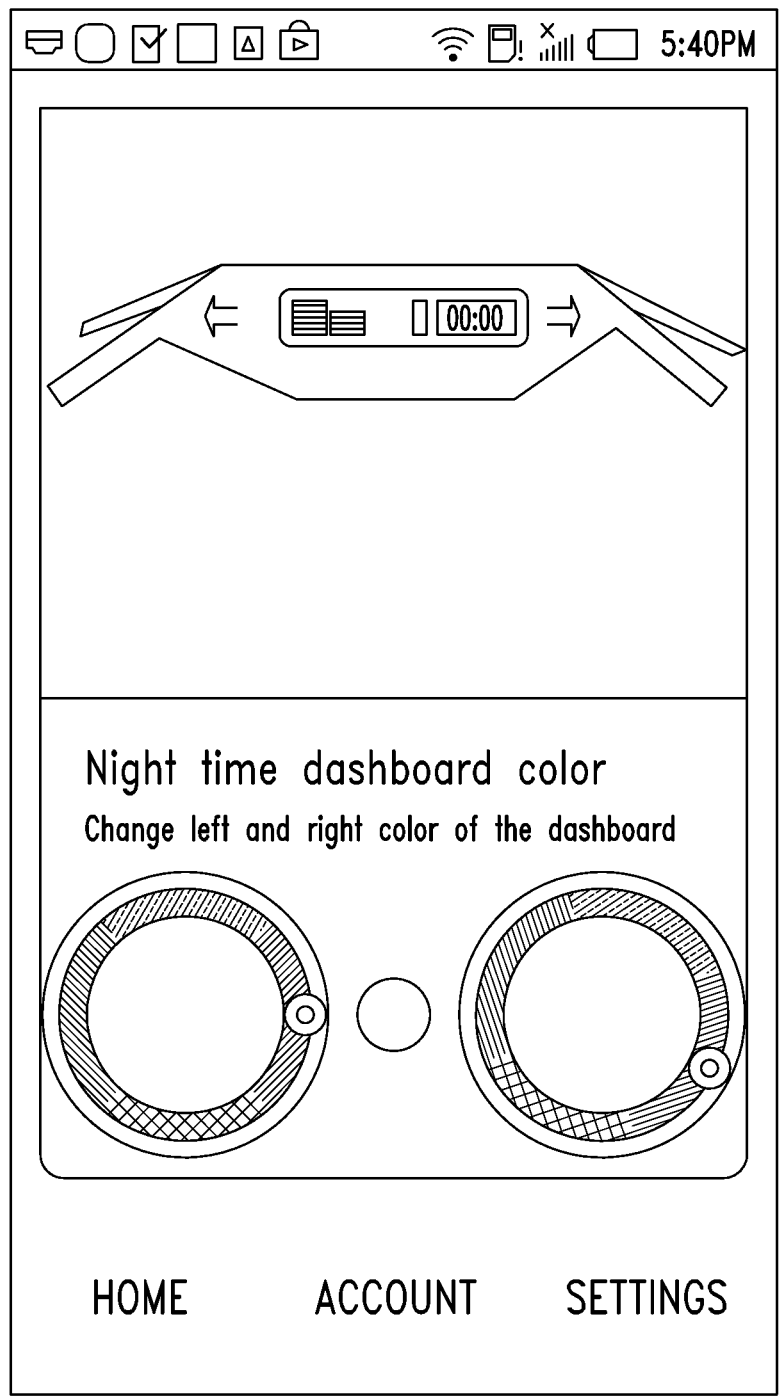
FIG. 12 is an example user interface of a user mobile device presenting an example user menu providing menu choices regarding further vehicle setup options for a selected portion regarding changing user configurable colors of the vehicle dashboard, according to one non-limiting illustrated embodiment.

FIG. 12 is an example user interface of a user mobile device presenting an example user menu providing menu choices regarding further vehicle setup options for a selected portion regarding changing user configurable colors of the vehicle dashboard, according to one non-limiting illustrated embodiment. For example, this user menu may appear directly, or indirectly through other menu selections, as a result of or in response to the user selecting a corresponding portion of the dashboard image shown in FIG. 11 indicated by one of the arrows in FIG. 11. Shown are two interactive color wheels the user may adjust to independently adjust the colors on either side of the vehicle dashboard. Similar menus may be presented when the user selects corresponding portions of the vehicle images presented to adjust the colors or arrangements of other lighting patterns of the vehicle.

Figure 13:
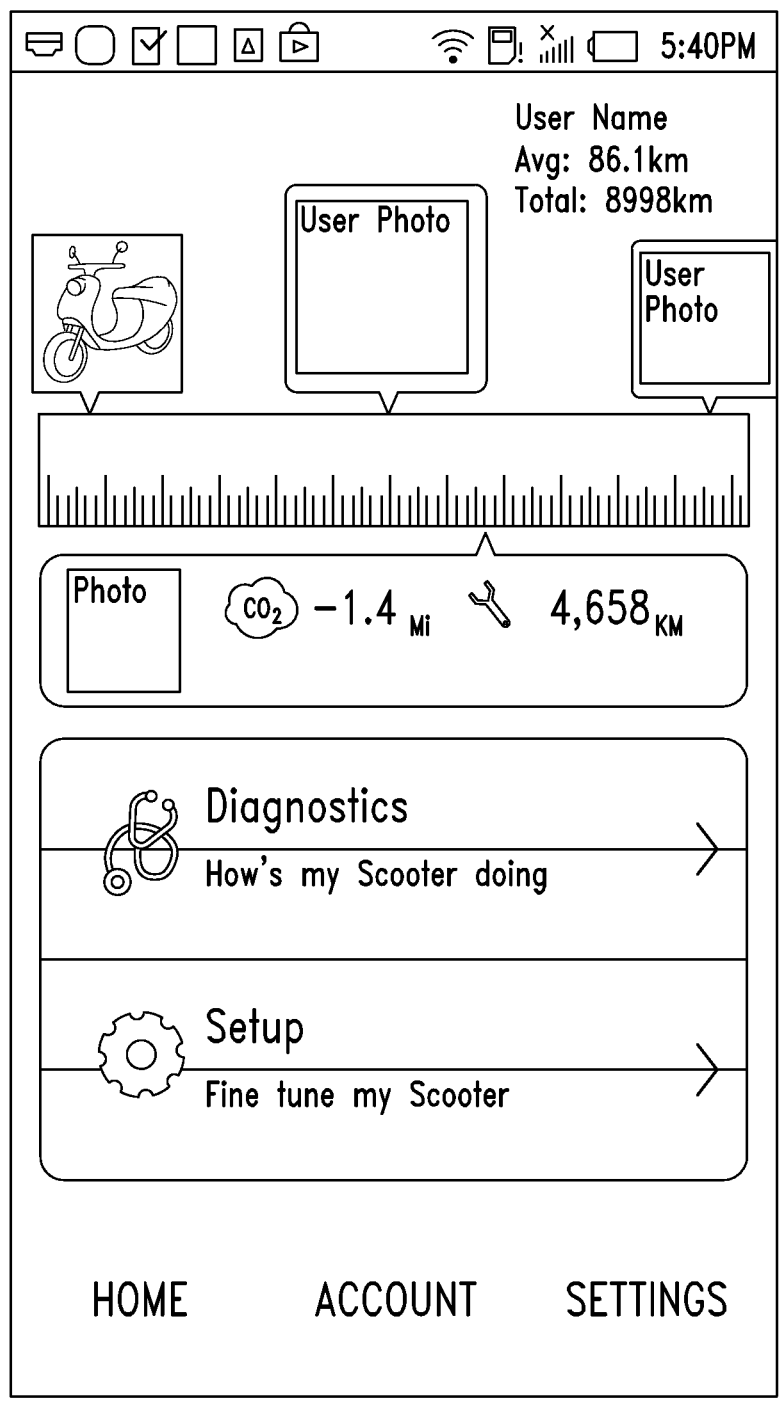
FIG. 13 is an example user interface of a user mobile device presenting an example user menu providing menu choices regarding further diagnostics or vehicle status information options, according to one non-limiting illustrated embodiment.

FIG. 13 is an example user interface of a user mobile device presenting an example user menu providing menu choices regarding further diagnostics or vehicle status information options, according to one non-limiting illustrated embodiment. For example, this user menu may appear directly, or indirectly through other menu selections, as a result of or in response to the user selecting the "My Battery Provider Me and my ride" or "Settings" selectable menu option shown in FIG. 9. Shown is information regarding current weather, current maintenance reminders, a timeline with maintenance reminders and other reminders, a user profile photo and other relevant information to the user. Also shown is a "Setup" selectable menu item, selectable by the user to enable the user to configure or set up configurable options for the vehicle on their mobile device, such as, for example, those shown in FIGS. 10-12. Also shown is a "Diagnostics" selectable menu item, selectable to enable the user to have a diagnostic test and/or report executed and/or presented on their mobile device.

FIG. 14 is an example user interface of a user mobile device presenting an example user menu providing a diagnostic reports and menu choices regarding the diagnostic report, according to one non-limiting illustrated embodiment. For example, the interactive diagnostic report presented shows, on or next to a "Lighting system" selectable menu option a message or alert that a light of the vehicle needs to be replaced and that other tested or detected statuses of items regarding the vehicle are in good condition. The user may then select various items, such as the light error, to learn more about the vehicle item corresponding to the selected item on the report.

FIG. 15 is an example user interface of a user mobile device presenting an example interactive vehicle diagnostics report and further menu choices regarding the diagnostic report, according to one non-limiting illustrated embodiment. For example, this user menu may appear directly, or indirectly through other menu selections, as a result of or in response to the user selecting the "Lighting system" selectable menu option shown in FIG. 14 shown as part of the diagnostic report. The user may select the "find service center" selectable menu option to be presented with further information regarding a service center to resolve the issue to which the menu pertains (e.g., display an interactive map showing vehicle service centers that have replacement bulbs and/or that can replace the vehicle light).

FIG. 16 is an example user interface of a user mobile device presenting an example user menu providing an interactive map indicating current user location and portable electrical power storage device collection and distribution machine locations, according to one non-limiting illustrated embodiment. For example, this user menu may appear directly, or indirectly through other menu selections, as a result of or in response to the user selecting the "Batteries" selectable menu option shown in FIG. 14.

Figure 17:
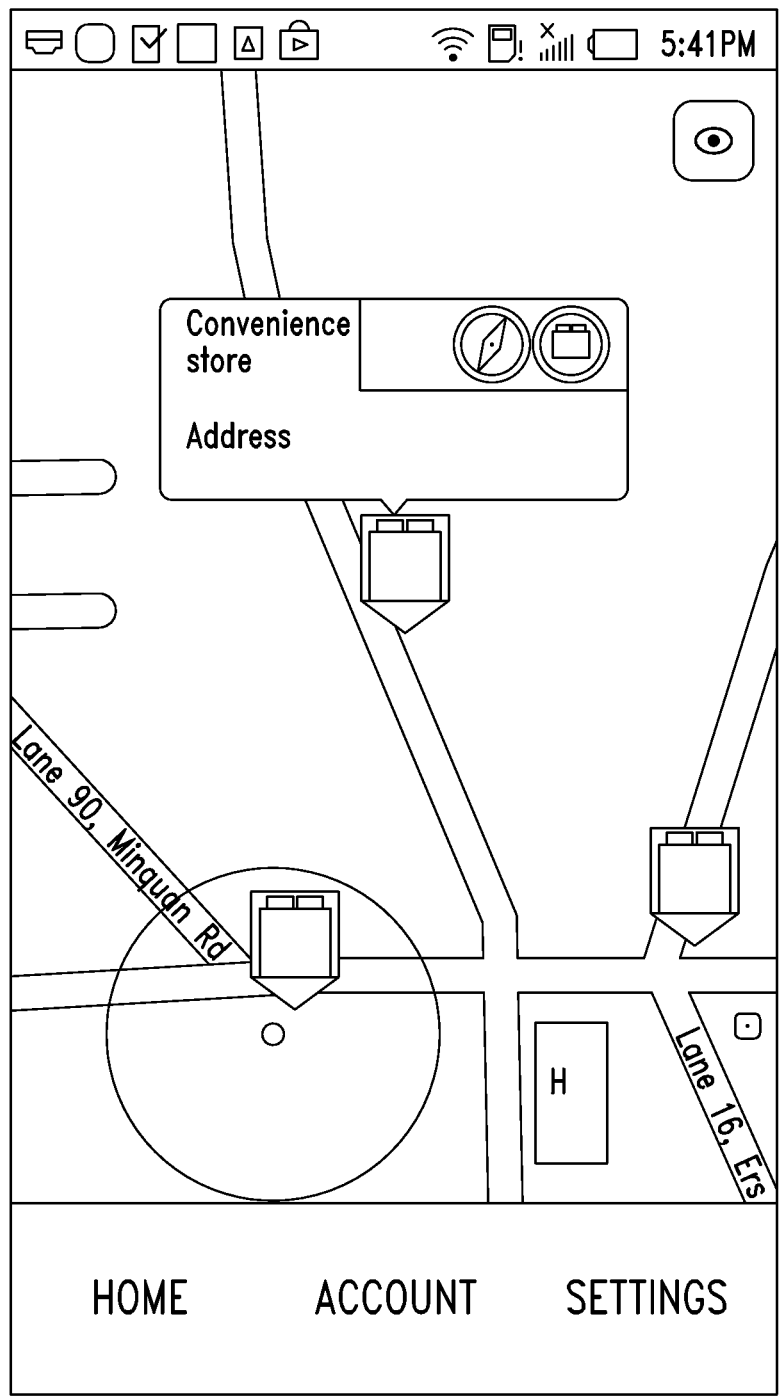
FIG. 17 is an example user interface of a user mobile device presenting an example user menu providing an interactive map indicating current user location and further information regarding a selected portable electrical power storage device collection and distribution machine location on the map, according to one non-limiting illustrated embodiment.

FIG. 17 is an example user interface of a user mobile device presenting an example user menu providing an interactive map indicating current user location and further information regarding a selected portable electrical power storage device collection and distribution machine location on the map, according to one non-limiting illustrated embodiment. For example, this user menu may appear directly, or indirectly through other menu selections, as a result of or in response to the user selecting the corresponding selectable portable electrical power storage device exchange location shown on the interactive map of FIG. 16.

Figure 18:
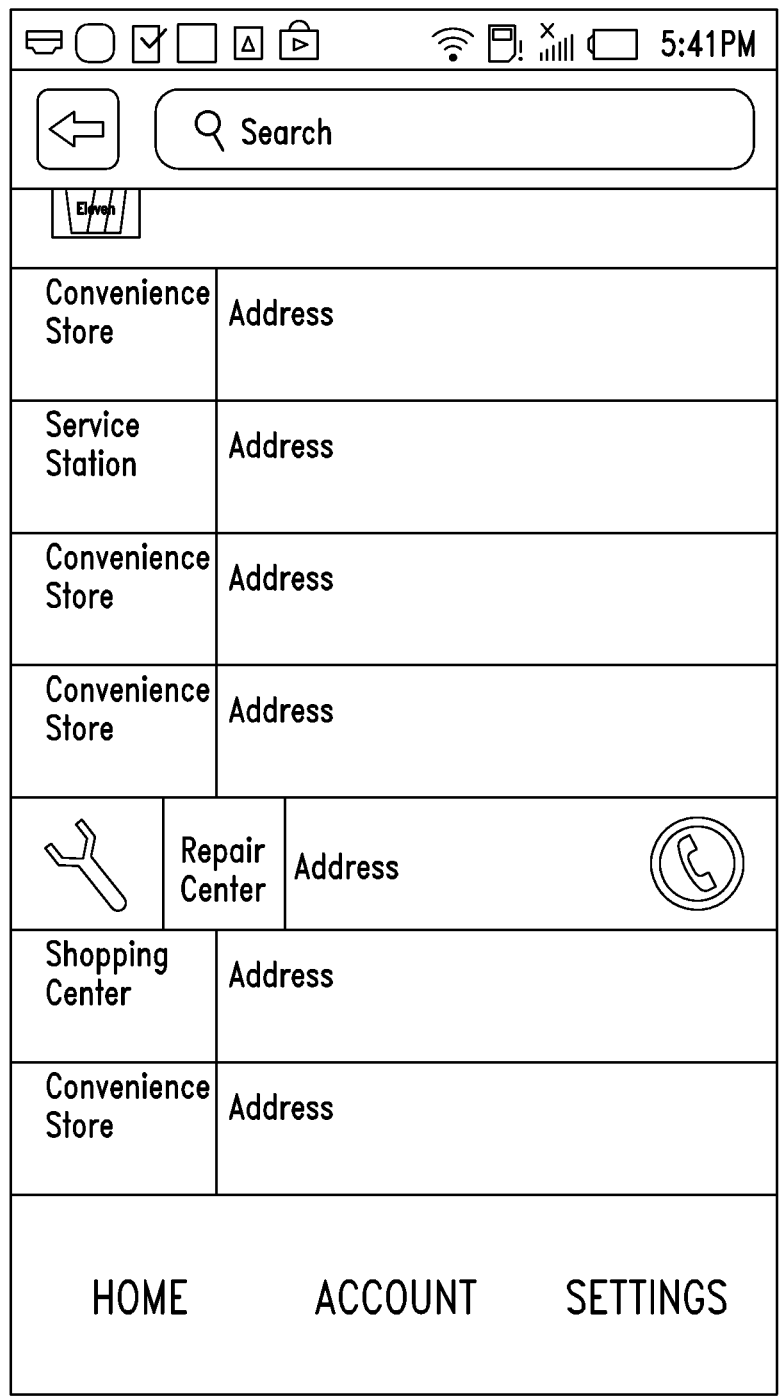
FIG. 18 is an example user interface of a user mobile device presenting an example interactive list of portable electrical power storage device collection and distribution machine locations, and vehicle service and repair locations in order of distance from a current location of the user, according to one non-limiting illustrated embodiment.

FIG. 18 is an example user interface of a user mobile device presenting an example interactive list of portable electrical power storage device collection and distribution machine locations, and vehicle service and repair locations in order of distance from a current location of the user, according to one non-limiting illustrated embodiment. For example, this user menu may appear directly, or indirectly through other menu selections, as a result of or in response to the user selecting the "Batteries" selectable menu option shown in FIG. 14. Also or instead, this user menu may appear directly, or indirectly through other menu selections, as a result of or in response to the user selecting a corresponding selectable option by selection of the "eye" in the upper right hand corner shown in the interface shown in FIG. 17 and/or via the "settings" selectable item shown in the interface shown in FIG. 17 to display the list.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/778,038, entitled "APPARATUS, METHOD AND ARTICLE FOR CHANGING PORTABLE ELECTRICAL POWER STORAGE DEVICE EXCHANGE PLANS" and filed Mar. 12, 2013, corresponding to U.S. non-provisional patent application Ser. No. 14/204,857 and published as U.S. Patent Application Publication No. 20140279576; U.S. provisional patent application Ser. No. 61/601,949, entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012; U.S. provisional patent application Ser. No. 61/511,900, entitled "APPARATUS, METHOD AND ARTICLE FOR COLLECTION, CHARGING AND DISTRIBUTING POWER STORAGE DEVICES, SUCH AS BATTERIES" and filed Jul. 26, 2011; U.S. provisional patent application Ser. No. 61/511,887, entitled "THERMAL MANAGEMENT OF COMPONENTS IN ELECTRIC MOTOR DRIVE VEHICLES" and filed Jul. 26, 2011 and U.S. provisional patent application Ser. No. 61/511,880, entitled "DYNAMICALLY LIMITING VEHICLE OPERATION FOR BEST EFFORT ECONOMY" and filed Jul. 26, 2011; are incorporated herein by reference, in their entirety. Aspects of the embodiments can be modified, if necessary, to employ systems, circuits and concepts of the various patents, applications and publications to provide yet further embodiments.

While generally discussed in the environment and context of collection, charging and distribution of portable electrical energy storage devices for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A method in a system for providing information regarding a vehicle, the method comprising:
   receiving, by a processor of a user mobile device, a usage history of the vehicle and a status of a portable energy storage device configured to power the vehicle;
   receiving, by the processor of the user mobile device, a historical driving habit associated with a user profile associated with the vehicle, wherein the historical driving habit corresponds to an estimate of power consumption;
   generating, by the processor of the user mobile device, an alert based on the estimate of power consumption corresponding to the historical driving habit, the usage history of the vehicle, and the status of the portable energy storage device;
   preparing, by the processor of the user mobile device, data for presentation on a display of the user mobile device based on the alert and a selectable menu option associated with the alert;
   in response to a selection of the selectable menu option, presenting information regarding a solution addressing the alert; and
   in response to the selection of the selectable menu option, presenting information regarding a service center for addressing the alert.

2. The method of claim 1 wherein the vehicle is an electrically powered vehicle or a hybrid electrically powered vehicle.

3. The method of claim 1 further comprising receiving either the usage history of the vehicle and the status of the portable energy storage device from a first source or the historical driving habit from a second source over a short range wireless connection.

4. The method of claim 1 wherein the portable energy storage device is a first portable electrical energy storage device, and wherein the system includes a second portable electrical energy storage device that powers a motor of the vehicle.

5. The method of claim 1 wherein the historical driving habit is from a remote vehicle data information management system.

6. The method of claim 1 wherein the historical driving habit is from one or more collection, charging and distribution machines for the vehicle.

7. The method of claim 1 further comprising:
   selecting a first source to receive the usage history of the vehicle and the status of the portable energy storage device; and
   selecting a second source to receive the historical driving habit.

8. The method of claim 7 wherein the status of the portable energy storage device includes data regarding a current charge level of the portable energy storage device of the vehicle and the historical driving habit includes information regarding an estimate of how far in terms of distance, or how long in terms of time, the current charge level of the portable energy storage device will last based on the historical driving habit.

9. The method of claim 1 further comprising presenting the data for presentation via a user interface on the display.

10. The method of claim 1 wherein the portable energy storage device is a first portable electrical energy storage device, and wherein the method further comprises communicating the usage history of the vehicle and the status of the portable energy storage device to a second portable electrical energy storage device that powers a motor of the vehicle.

11. The method of claim 1 further comprising preparing data for playing via a speaker of the user mobile device.

12. The method of claim 1 further comprising:
   receiving, by the processor of the user mobile device, input related to a change to a setting or a configuration of the vehicle; and wirelessly communicating to the vehicle, by the processor of the user mobile device, the received input to the vehicle.

13. The method of claim 1 further comprising:
wirelessly communicating to the vehicle, by the processor of the user mobile device, a change to a setting or a configuration of the vehicle based on an input received by the user mobile device.

14. The method of claim 12 further comprising receiving the input from a remote vehicle data information management system.

15. The method of claim 12 further comprising receiving the input over a wireless connection to the user mobile device from the portable electrical energy storage device.

16. The method of claim 12 wherein the change to the setting or the configuration of the vehicle is regarding one or more of: a selection regarding a customizable lighting pattern of lights of the vehicle and a selection regarding a customizable dashboard display of the vehicle.

17. A system for providing information regarding a vehicle, the system comprising:
a computer processor;
at least one memory coupled to the computer processor, wherein the at least one computer processor is configured to:
receive a usage history of the vehicle and a status of a portable energy storage device configured to power the vehicle and receive a user profile associated with the vehicle and a historical driving habit associated with the user profile, wherein the historical driving habit corresponds to an estimate of power consumption;
process the usage history of the vehicle, the status of the portable energy storage device, and the estimate of power consumption corresponding to the historical driving habit;
generate an alert based on the usage history of the vehicle, the status of the portable energy storage device, and the estimate of power consumption corresponding to the historical driving habit;
based on the alert, prepare data for presentation on a display of a remote device, wherein the presentation includes a selectable menu option associated with the alert;
in response to a selection of the selectable menu option, present information regarding a solution addressing the alert; and
in response to the selection of the selectable menu option, present information regarding a service center for addressing the alert.

18. The system of claim 17 wherein the remote device is a mobile device associated with the vehicle.

19. The system of claim 17 wherein the remote device is a collection, charging and distribution machine.

20. The method of claim 1, wherein the presentation includes an offer regarding available portable energy storage devices.

* * * * *